United States Patent
Ren et al.

(10) Patent No.: US 10,402,173 B2
(45) Date of Patent: Sep. 3, 2019

(54) SYSTEMS AND METHODS FOR ARBITRARY SOFTWARE LOGIC MODELING

(71) Applicant: General Electric Company, Schenectady, NY (US)

(72) Inventors: Liling Ren, Niskayuna, NY (US); Han Yu, Niskayuna, NY (US); Gregory Reed Sykes, Grand Rapids, MI (US); Michael Richard Durling, Gansevoort, NY (US); Kit Yan Siu, Niskayuna, NY (US); Scott Alan Stacey, Dayton, OH (US)

(73) Assignee: General Electric Company, Schenectady, NY (US)

( * ) Notice: Subject to any disclaimer, the term of this patent is extended or adjusted under 35 U.S.C. 154(b) by 308 days.

(21) Appl. No.: 15/441,626

(22) Filed: Feb. 24, 2017

(65) Prior Publication Data

US 2018/0246703 A1 Aug. 30, 2018

(51) Int. Cl.
| | |
|---|---|
| *G06F 8/20* | (2018.01) |
| *G06F 8/34* | (2018.01) |
| *G06F 8/35* | (2018.01) |
| *G06F 8/30* | (2018.01) |
| *G06F 9/44* | (2018.01) |
| *G06F 9/455* | (2018.01) |

(52) U.S. Cl.
CPC ............... *G06F 8/20* (2013.01); *G06F 8/313* (2013.01); *G06F 8/34* (2013.01); *G06F 8/35* (2013.01);
(Continued)

(58) Field of Classification Search
CPC ........ G06F 8/20; G06F 8/30; G06F 8/33–355; G06F 9/44; G06F 9/4496; G06F 9/45504;
(Continued)

(56) References Cited

U.S. PATENT DOCUMENTS

| | | | |
|---|---|---|---|
| 7,047,518 B2 | 5/2006 | Little et al. | |
| 8,522,196 B1 * | 8/2013 | Kim | G06F 11/3664 717/100 |

(Continued)

FOREIGN PATENT DOCUMENTS

WO 2013/178735 A1 12/2013

OTHER PUBLICATIONS

Anonymous, Simulink User's Guide, The Mathworks, Inc. [online], 2015 [retrieved Feb. 19, 2019], Retrieved from Internet: <URL: https://fenix.tecnico.ulisboa.pt/downloadFile/845043405443232/sl_using_r2015a.pdf>, pp. 4-49-4-66.*

(Continued)

*Primary Examiner* — Todd Aguilera
(74) *Attorney, Agent, or Firm* — Buckley, Maschoff & Talwalkar, LLC

(57) ABSTRACT

According to some embodiments, an Arbitrary Software Logic Modeling ("ASLM") data source may store electronic records associated with units, each electronic record including a unit identifier, one or more identification tags, context data, unit parameters, unit variables, and internal logic. An ASLM platform may express system requirements at a logic block level and establish the logic blocks as self-contained entities and connections in accordance with the system requirements (the established logic blocks graphically representing systems logic). The ASLM platform may then explicitly transform the systems logic automatically to output language agnostic common design information exchange model information. The ASLM platform may also translate and maintain traceability among the system requirements, common design information exchange model information, and generated code.

20 Claims, 18 Drawing Sheets

(52) U.S. Cl.
CPC ............... *G06F 9/44* (2013.01); *G06F 9/455* (2013.01); *G06F 8/30* (2013.01)

(58) Field of Classification Search
CPC ....... G06F 9/455; G06F 17/5009–5063; G06F 8/313
USPC ...................... 717/100, 104–114; 703/13–22
See application file for complete search history.

(56) References Cited

U.S. PATENT DOCUMENTS

| | | | |
|---|---|---|---|
| 8,667,463 | B2 | 3/2014 | Lin et al. |
| 8,752,005 | B2 | 6/2014 | Kuriakose et al. |
| 8,843,909 | B2 | 9/2014 | Tondreau, Jr. et al. |
| 8,874,411 | B2 | 10/2014 | Ishikawa et al. |
| 9,569,179 | B1 * | 2/2017 | Kachmar ............... G06F 8/30 |
| 2007/0168920 | A1 | 7/2007 | Bailleul |
| 2009/0049422 | A1 | 2/2009 | Hage et al. |
| 2012/0096439 | A1 * | 4/2012 | Lin ........................ G06F 8/10 717/125 |

OTHER PUBLICATIONS

Mäder, P., et al., Enabling Automated Traceability Maintenance through the Upkeep of Traceability Relations [online], Springer, 2009 [retrieved Feb. 19, 2019], Retrieved from Internet: <URL: https://link.springer.com/chapter/10.1007/978-3-642-02674-4_13>, pp. 174-189.*

McCabe, Thomas J., "A Complexity Measure", IEEE Transactions on Software Engineering, vol. SE-2, No. 4, Dec. 1976, (pp. 308-320, 13 total pages).

Asuncion, Hazeline U. et al., "Software Traceability with Topic Modeling", ICSE '10 Proceedings of the 32nd ACM/IEEE International Conference on Software Engineering, vol. 1, 2010, (10pgs).

"Eclipse BPMN2 Modeler User Guide," Version 1.0.1 of BPMN2 Modeler, Retrieved from the internet URL: https://www.eclipse.org/bpmn2-modeler/documentation/BPMN2ModelerUserGuide-1.0.1.pdf15, on Dec. 18, 2018, pp. 1-84 ( Nov. 15, 2013).

Fowler, M., et al., "Refactoring: Improving the Design of Existing Code," International Publishing, Springer, vol. 2418, pp. 1-337 (Jan. 1, 2002 ).

Jastram, M., "The Eclipse Requirements Modeling Framework," Managing Requirements Knowledge, pp. 353-372 (Apr. 12, 2013).

Kuster, T., "Development of a Visual Service Design Tool providing a mapping from BPMN to JIAC," Thesis published in Technical University of Berlin, pp. 1-93 (Apr. 18, 2007).

Partial European Search Report and Opinion issued in connection with corresponding EP Application No. 18158439.2 dated Jun. 11, 2018.

Extended European Search Report and Opinion issued in connection with corresponding EP Application No. 18158439.2 dated Oct. 8, 2018.

* cited by examiner

SYSTEMS AND METHODS FOR ARBITRARY SOFTWARE LOGIC MODELING

BACKGROUND

In software design, functionalities are normally implemented using software source code such as functions, procedures, or routines. This is true for both procedural and object oriented design, although in the latter these are often referred to as "methods." As used herein, these entities are collectively referred to as "functions." Functions may be used, for example, to implement low-level functionalities as simple as a single mathematic operation, and high-level functionalities that control components of a large system. As used herein, the term "unit" may refer to software units that are analogous to functions. Note that units are not necessarily source code based, but may instead be model based to represent a functionality partition of similar scope. Manually modeling the internal logic (e.g., algorithm) of any given arbitrary structure for a single unit and/or a multitude of units can be a time consuming, error-prone, and expensive task. Moreover, it can be difficult to keep track of high and low level requirements and how those requirements map to various functions and/or units. As a result, there are significant difficulties and associated costs to maintain, evolve, enhance, transform, and re-innovate complex, long-lived, systems (e.g., such as safety-critical avionics and ground system software).

Note that no single existing model-based design system can effectively solve these problems and challenges. Generally speaking, model-based design tools fall into two major categories: 1) tools for reactive systems (such as real-time control systems), and 2) tools for regular systems. Tools for reactive systems are targeted for a specific kind of application. They tend to have very restricted and limited modeling constructs, and thus may not be appropriate for complex, interactive, information systems. Tools for regular systems are generally able to handle interactive systems, but their design philosophy is usually focused on objected oriented design. As a result, they lack the ability to fully, efficiently, and effectively support complex, long-lived, safety critical systems. Note that complex, long-lived, safety critical systems may be characterized by stringent certification requirements and variants released over the life of the product line that still need to be maintained many years after their initial release. The ability to bridge the investment and accumulation of knowledge from the past in complex, long-lived, safety critical system and the transformative re-innovation for future products in years to come does not exist. Activity diagrams, as often used in Unified Modeling Language ("UML") based modeling, is only useful when a new software system is designed from scratch using very fragmented classes and may not be helpful with existing arbitrary logic.

It would therefore be desirable to facilitate arbitrary software logic modeling in an automatic and accurate manner.

SUMMARY

According to some embodiments, an Arbitrary Software Logic Modeling ("ASLM") data source may store electronic records associated with units, each electronic record including a unit identifier, one or more identification tags, context data, unit parameters, unit variables, and internal logic. An ASLM platform may express system requirements at a logic block level and establish the logic blocks as self-contained entities and connections in accordance with the system requirements (the established logic blocks graphically representing systems logic). The ASLM platform may then explicitly transform the systems logic automatically to output language agnostic common design information exchange model information. The ASLM platform may also translate and maintain traceability among the system requirements, common design information exchange model information, and generated code.

Some embodiments comprise: means for accessing an ASLM data source storing electronic records associated with units, each electronic record including a unit identifier, one or more identification tags, context data, unit parameters, unit variables, and internal logic; means for expressing, via a computer processor of an ASLM platform, system requirements at a logic block level; means for establishing the logic blocks as self-contained entities and connections in accordance with the system requirements, the established logic blocks graphically representing systems logic; means for explicitly transforming the systems logic automatically to output language agnostic common design information exchange model information; and means for translating and maintaining traceability among the system requirements, common design information exchange model information, and generated code.

Some technical advantages of some embodiments disclosed herein are improved systems and methods to facilitate arbitrary software logic modeling in an automatic and accurate manner.

DETAILED DESCRIPTION

In the following detailed description, numerous specific details are set forth in order to provide a thorough understanding of embodiments. However it will be understood by those of ordinary skill in the art that the embodiments may be practiced without these specific details. In other instances, well-known methods, procedures, components and circuits have not been described in detail so as not to obscure the embodiments.

Figure 1:
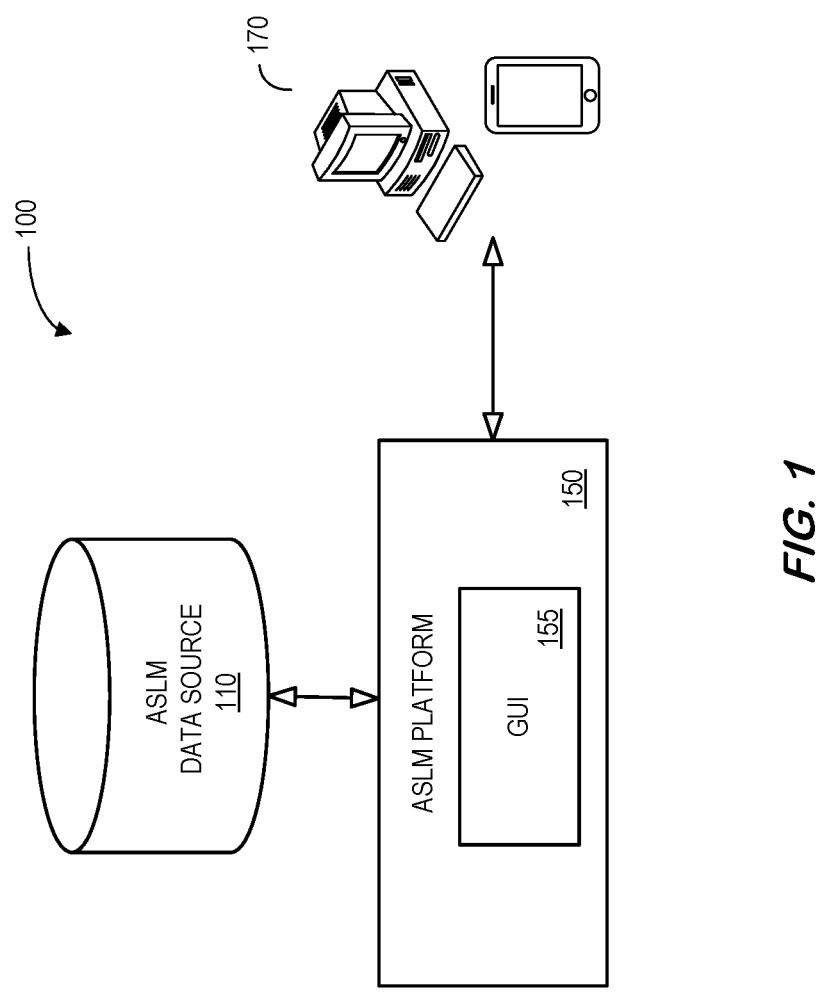
FIG. 1 is a high-level block diagram of a system that may be provided in accordance with some embodiments.

FIG. 1 is a high-level architecture of a system 100 in accordance with some embodiments. The system 100 includes an Arbitrary Software Logic Modeling ("ASLM") data source 110 that provides information to an ASLM platform 150. Data in the ASLM data source 110 might include, for example, information about software components, applications, High Level-Requirements ("HLR") documents, Low-Level Requirements ("LLR") documents, software code, etc.

The ASLM platform 150 may, according to some embodiments, access the ASLM data source 110 and facilitate the creation and/or manipulation of software elements. According to some embodiments, a Graphical User Interface ("GUI") 155 of the ASLM platform 150 may interact with remote user devices 170 to automatically perform operations on these software components. As used herein, the term "automatically" may refer to, for example, actions that can be performed with little or no human intervention.

As used herein, devices, including those associated with the system 100 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The ASLM platform 150 may store information into and/or retrieve information from various data sources, such as the computer ASLM data source 110 and/or user platforms 170. The various data sources may be locally stored or reside remote from the ASLM platform 150. Although a single ASLM platform 150 is shown in FIG. 1, any number of such devices may be included. Moreover, various devices described herein might be combined according to embodiments of the present invention. For example, in some embodiments, the ASLM platform 150 and one or more data sources might comprise a single apparatus. The functions of the ASLM platform 150 may be performed by a constellation of networked apparatuses, such as those associated with a distributed processing or cloud-based architecture.

Figure 2:
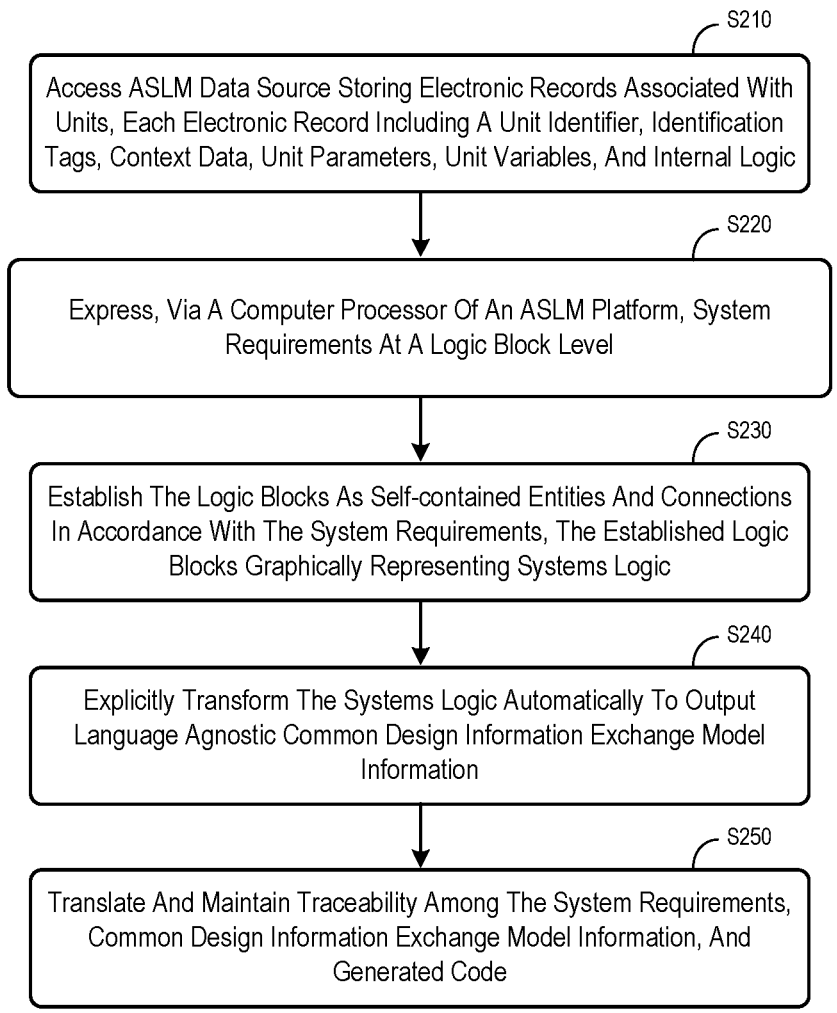
FIG. 2 is a method to facilitate arbitrary software logic modeling according to some embodiments.

The elements of the system 100 may operate to implement any of the embodiments described herein. For example, FIG. 2 illustrates a method to facilitate arbitrary software logic modeling that might be performed by some or all of the elements of the system 100 described with respect to FIG. 1. The flow charts described herein do not imply a fixed order to the steps, and embodiments of the present invention may be practiced in any order that is practicable. Note that any of the methods described herein may be performed by hardware, software, manually through a GUI, or any combination of these approaches. For example, a computer-readable storage medium may store thereon instructions that when executed by a machine result in performance according to any of the embodiments described herein.

At S210, an ASLM platform may access an ASLM data source storing electronic records associated with units, each electronic record including a unit identifier, one or more identification tags, context data, unit parameters, unit variables, and internal logic. According to some embodiments, at least one electronic record in the ASLM data source may represent a block entity, including a block identifier, one or more identification tags, arguments, block parameters, block variables, and actions. According to some embodiments, the ASLM data source may not store all information elements described herein, nor exhaustively store all units for a complete system or a system component.

At S220, the system may express, via a computer processor of an ASLM platform, system requirements at a logic block level. The system requirement might represent, for example, Low-Level Requirements ("LLRs") and/or High-Level Requirements ("HLRs"). At S230, the system may establish the logic blocks as self-contained entities and connections in accordance with the system requirements, the established logic blocks graphically representing systems logic. As used herein, the phrase "systems logic" might be associated with, for example, control nodes, looping nodes, merge nodes, entry nodes, exit nodes, and/or null nodes.

At S240, the system may explicitly transform the systems logic automatically to output language agnostic Common Design Information Exchange Model ("CDIM") information. The CDIM standard may be used, for example, to provide common design information in connection with components or function elements associated with traced ontology, traced HLRs, data types, variables, and/or interfaces. At S250, the system may translate and maintain traceability among the system requirements, common design information exchange model information, and generated code.

Thus, some embodiments described herein may provide methods and computer program tools to model arbitrary software logic within a single programming unit and/or across multiple programming units using block entities. A block entity is a basic software building block that is intended to carry out an action or a plurality of actions to serve giving purposes in the software. At least one block entity may be defined, implementing an action or a plurality of actions, expressing at least one first aspect of a low-level requirement or a plurality of low-level requirements, maintaining traceability to higher-level requirements, and providing interfaces to interact with other block entities. A block entity or a plurality of block entities may be connected by a control flow network, controlling actions among block entities, expressing at least one second aspect of a low-level requirement or a plurality of low-level requirements. Moreover, traceability to higher-level requirements and software tests may be maintained to form the software logic of any given arbitrary structure for a unit or a multitude of units. Software code may then be generated from the model in a selected programming language.

Figure 3:
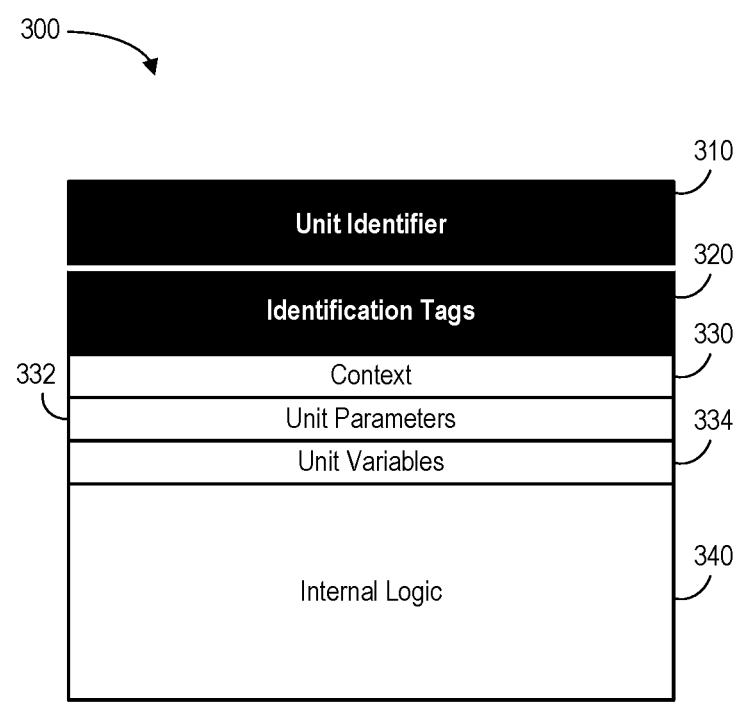
FIG. 3 illustrates a unit according to some embodiments.

Some embodiments described herein may be associated with a unit, such as the unit 300 illustrated in FIG. 3. Note that FIG. 3 shows some basic elements that may constitute a unit, in addition to any custom elements (such as annotations, not shown in FIG. 3) that might be used for a specific application. All basic elements might be identified following a naming convention specified in a defined software design standard, either specific to the problem domain or as a general standard for a tool.

A unit identifier 310 may represent a descriptive name used to explicitly identify the intended functionality of the unit 300. The unit identifier 310 for a unit does not have to be globally unique, as long as it is unique within the scope of the architectural element that encapsulates the current unit. A defined software design standard may impose additional requirements on identifier uniqueness. One or more identification tags 320 may explicitly maintain traceability of the unit identifier 310, and the unit 300 itself, to higher-level requirements, including derived requirements. An identification tag 320 might be either globally unique, or be unique within the scope of the level of requirements it traces to, if so specified in the defined software design standard. The unit 300 may also include context data 330 used to explicitly specify dependencies to entities external to the current unit. Context data may include data members or variables of the class or package to which the unit belongs to, or global variables, among others.

The unit 300 may further include unit parameters 332 used to represent formal data items expected to be received and to be outputted by the unit 300. Note that unit parameters 332 may be analogous to parameters defined for a function. The unit parameters 332 may define the external unit interface. Thus, individual parameters of the unit parameters 332 may trace to (not shown) the ontology in a way similar to the way identification tags 320 used to explicitly maintain traceability of the unit identifier 310 to higher-level requirements. Unit parameter traceability to ontology may be important for software units that are exposed as external interfaces of a software component. This traceability may allow for transformation (e.g., automatically) of the software component interface while maintaining readability (for human), interface completeness, and software integrity. Unit variables 334 (including any associated unit declarations) may represent variables that are only intended for use within the unit 300. Unit variables 334 may be similar to unit parameters 332 in that they are accessible anywhere within the unit 300. The unit 300 may further include internal logic 340 that represents specific functionalities intended to be carried out by the unit 300. The internal logic 340 may be represented by a control flow network that connects block entities for the unit 300.

The unit identifier 310, identification tag(s) 320, and internal logic 340 may represent essential elements of a unit 300. A unit 300 that has no explicit context data 330 may have an implicit "empty" context. The same may be true for unit parameters 332 and unit variables 334. If source code is used as a master archive, language features might be used according to design standards to represent the definition of the unit 300 and its elements.

Figure 4:
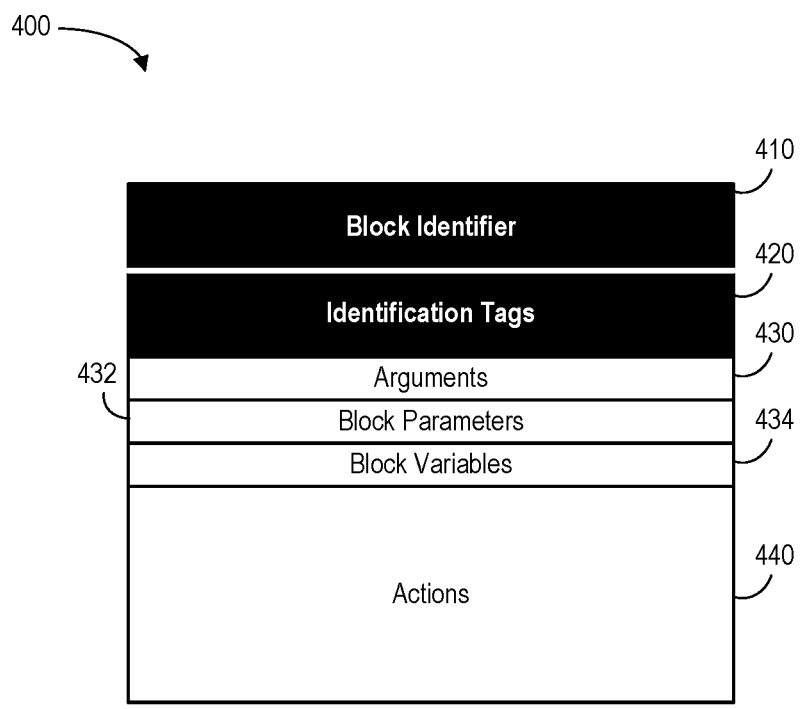
FIG. 4 illustrates a block entity in accordance with some embodiments.

Some embodiments described herein may be associated with a block entity, such as the block entity 400 illustrated in FIG. 4. FIG. 4 shows basic elements that may constitute a block entity, in addition to any custom elements (such as annotations, not shown in FIG. 4) that can be used for a specific application. All basic elements might be identified following a naming convention specified in a defined software design standard, either specific to the problem domain or as a general standard for a tool.

The block entity 400 may include a block identifier 410 that is a descriptive name used to explicitly identify the intended functionality of the block entity 400. The block identifier 410 for a block unit may not need to be globally unique, as long as it is unique within the scope of the architectural element that encapsulates the current unit. This implies that, in general, uniqueness within the current unit is not sufficient. A defined software design standard may impose additional requirements on identifier uniqueness.

The block entity 400 may include one or more identification tags 420 that are used to explicitly maintain traceability of the block identifier 410, and the block entity 400 itself, to higher-level requirements, including derived requirements. Conceptually, identification tags 420 for a block may be no different from that for a unit. Block arguments 430 may be used to represent concrete data items passed to and from the block entity 400. They are essentially selected items from the unit context, unit parameters, and unit variables to serve the needs of the block entity 400. Arguments 430 can either be input, output or both. Block parameters 432 may be used to represent formal data items expected to be received and to be outputted by the block entity 400. Block parameters 432 may be analogous to parameters defined for a function. A purpose of using the combination of block arguments 430 and block parameters 432 may be to isolate block actions 440 from the environmental context so that the implementation of actions can be more generalized. This generalization may enable automated model transformation. In the source code (either manually written or generated from a model) model parameters 432 could be implicitly embedded in block actions. Note that a mapping may be established between block arguments 430 and parameters 432. Multiple parameters 432 may be mapped to (be realized by) a single argument 430, but only a single argument 430 can map to (realize) a single parameter 432. That is, multiple arguments 430 cannot map to a single parameter 432. Block variables 434 (including any associated block declarations) represent variables that are only intended for use within the scope of the block entity 400, regardless the actual location of their declaration in a unit.

Actions 440 represent functionalities intended to be carried out by the block entity 400. According to some embodiments, a regular block entity 400 cannot have only decision control actions 440 (except for block entities serving as nodes in a control flow network). Any decision control actions 440 in a regular block entity 400 must be companioned by non-decision control actions that are controlled by the decision control actions 440. Actions 440 may be expressed in terms of block parameters 432 and block variables 434. Data exchange might only be carried out using block parameters 432. Note that external data items, such as unit parameters and unit variables, may not be visible to block actions 440. A block entity 400 that has no explicit element of any given kind has an implicit empty element of the same kind (except the block identifier 410, which must be provided, and identification tags 420, at least one of which must be provided). If source code is used as the master archive, language features might be used according to the design standards to represent block elements and the boundary of the block entity 400. Note that, by definition, a block entity 400 cannot be a unit and vice versa. A block entity 400 may always have an element of the kind of arguments 430, even if the element is implicit, while a unit does not have any arguments.

Figure 5:
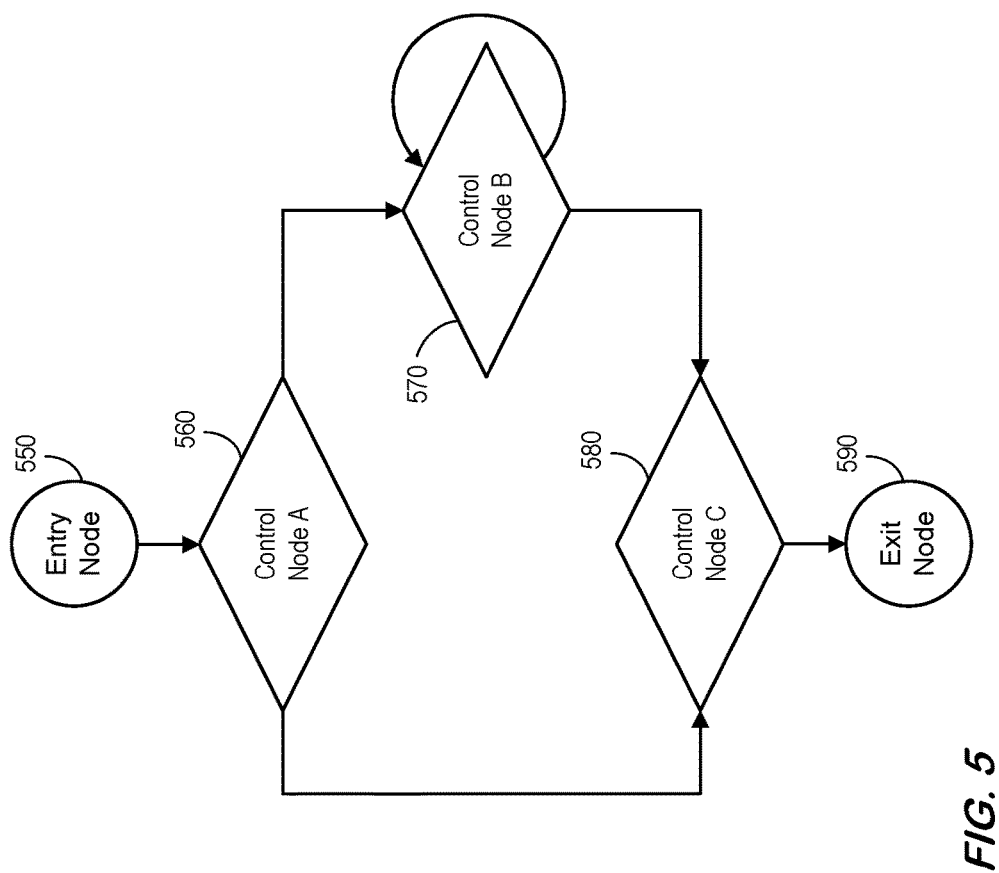
FIG. 5 is a control node and control flow network according to some embodiments.
Figure 5:
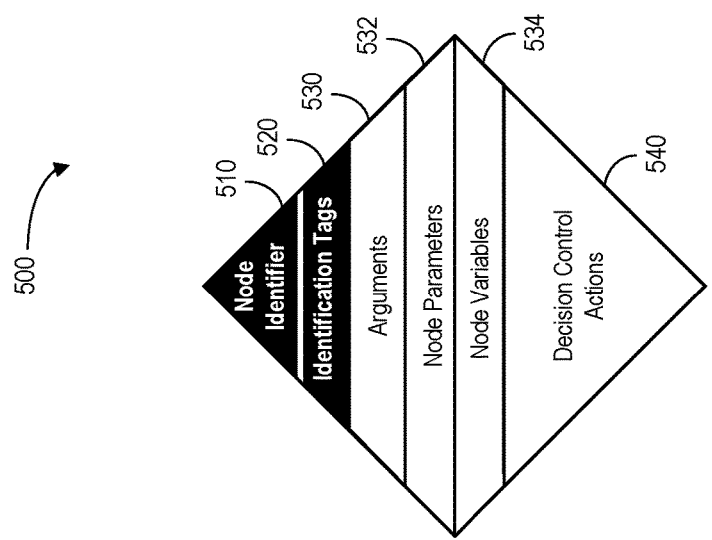

FIG. 5 illustrates 500 a control node (including a node identifier 510, identification tags 520, arguments 530, node parameters 532, node variables 534, and decision control actions 540) and control flow network according to some embodiments. FIG. 5 shows basic elements that may constitute a control flow network itself, in addition to regular block entities (not shown) and any custom elements, such as annotations (not shown) that can be used for a specific application. All basic elements might be identified following a naming convention specified in a defined software design standard, either specific to the problem domain or as a general standard for a tool. A control flow network resides within a unit. It may be exposed to the unit context, unit parameters, and unit variables. This means that unit context, unit parameters, and unit variables are visible by entities within the control flow network. Note that a control flow network might comprise a directional graph where each edge has a regular block entity and each node controls the execution of downstream block entities. A node in a control flow network can be viewed as a special kind of block entity. A node thus comprises of all the elements constituting a block entity. The same uniqueness requirements for block entities apply to nodes in a control flow network. The difference between a node in the control flow network and a regular block entity is the actions element. A node can only have decision control actions, while a regular block entity cannot have only decision control actions.

A control flow network has a single entry node 550 and a single exit node 590. Embodiments described herein based on this definition enable efficient automation to be used in the model transformation across unit boundaries. This definition is for software logic modeling purposes, it does not limit the realization of the software in actual source code, object code, or executable object code to a single entry point and single exit point design, even though the defined software design standard may impose such requirements or guidelines. The entry node 550 is a special kind of node whose only action is to initiate control for the unit. The exit node 590 is a special kind of node whose only action is to close control for the unit. By definition, the statement in a function that returns an output parameter to a caller cannot be included in an exit node 590 by its entirety. The parameter return functionality may instead be included as part of the actions element of a regular block entity. Only the action to close the control for the unit can be included in the exit node 590 for the unit. This method enables functions with multiple return statements be modeled as units with a single exit node 590.

A control node is where edges join together and branch out. While joining a node is not necessarily controlled by the control node, branching from a node is always controlled by the control node through its decision control actions. Elements that may constitute a control node is shown in the diamond shaped entity on the left of FIG. 5, in addition to any custom elements, such as annotations, not shown, that can be used for a specific application. Although many different kinds of decision control actions may be available, a specific application may limit the kinds of decision control actions that can be used, according to rules specified in a defined software design standard. Each control node can have only one kind of decision actions. In the embodiment shown in FIG. 5, three control nodes 560, 570, 580 are depicted. Control Node A 560 depicts a kind of decision control action analogous to a selection control structure. Control Node B 570 depicts a kind of iteration control structure. Control Node C 580 depicts a dedicated merge node that has implicit decision control action; that is, there is only one branch coming out this control node, thus no explicit decision control action is need. Other decision control actions may include but not limited to switch control structure. In the case of parallelized branches, multiple branches may be selected by the same control node. Note that a control structure must be closed by a merge node. This can be served by a dedicated merge node (such as Control Node C 580) or by a loop control node itself (such as Control Node B 570). Local variables of a control node remain in scope along their designated branch until the control structure is closed. Note that a control flow network may enable direct analysis of the complexity of the unit. Various control structural based complexity metrics might be calculated.

Figure 6:
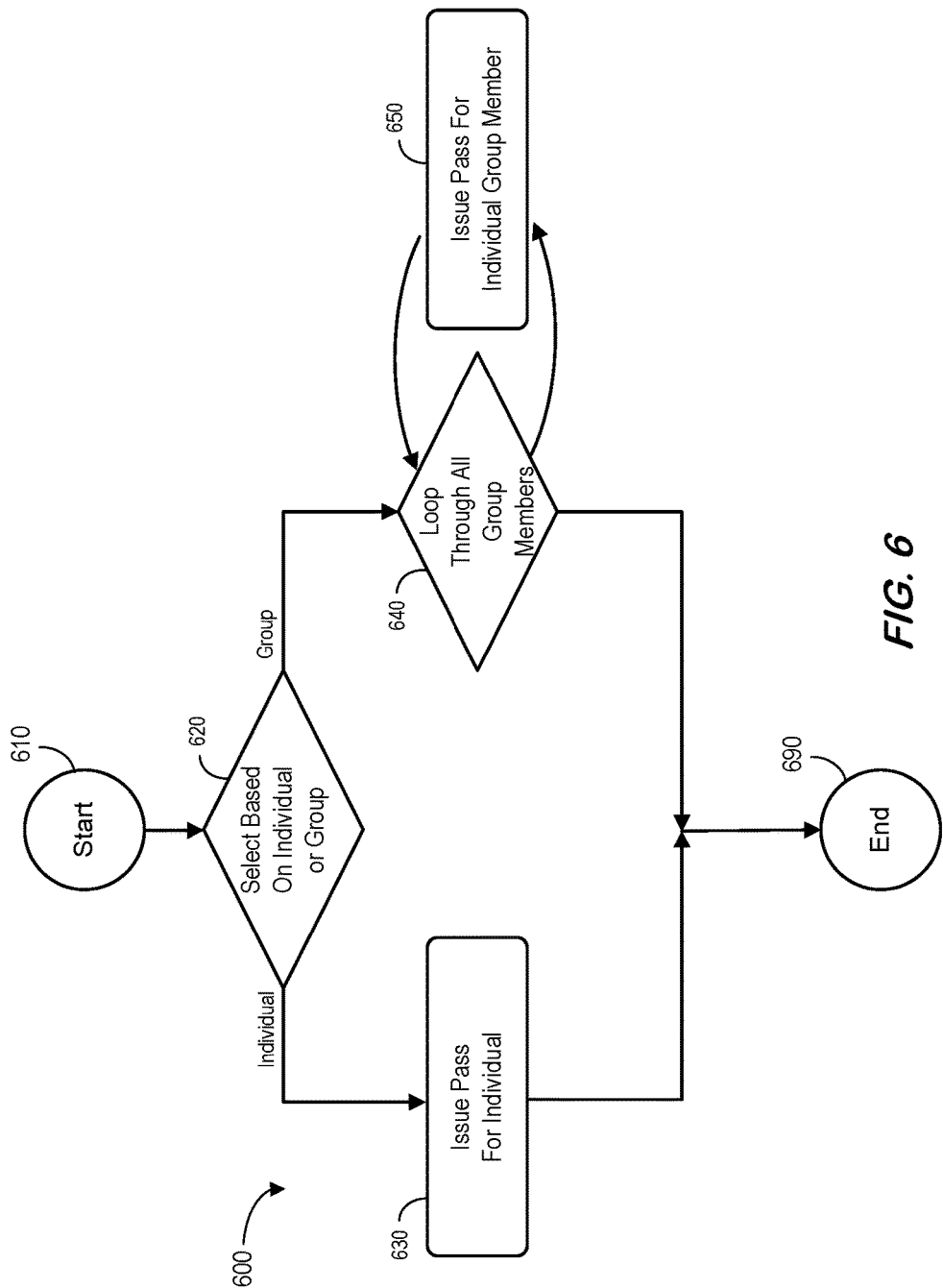
FIG. 6 is an example of issuing a security pass in accordance with some embodiments.

To describe methods for modeling arbitrary software logic, consider a sample problem for issuing security passes as illustrated by the process 600 shown in FIG. 6. It may be assumed that there are two scenarios: 1) issuing a security pass for an individual, and 2) issuing security passes for a group. In addition, an individual may fall under the category of either a "general" individual or a "special" individual (e.g., privileges for a special individual may be limited). Note that the distinction between a general individual and a special individual is not explicitly shown in FIG. 6. It is further assumed that the security passes have features to identify if an individual belongs to a group and that, to simplify security management, individuals within a group are not distinguished by their own category. For example, all members of a group are treated as having a special category. After starting at 610, the process 600 determines if an individual or group workflow should be initiated at 620. If an individual workflow is appropriate, the pass is issued at 630 and the process ends at 690. If a group workflow is appropriate, the process 600 loops through each member of the group at 640, issuing passes as appropriate at 650, before ending 690.

Figure 7:
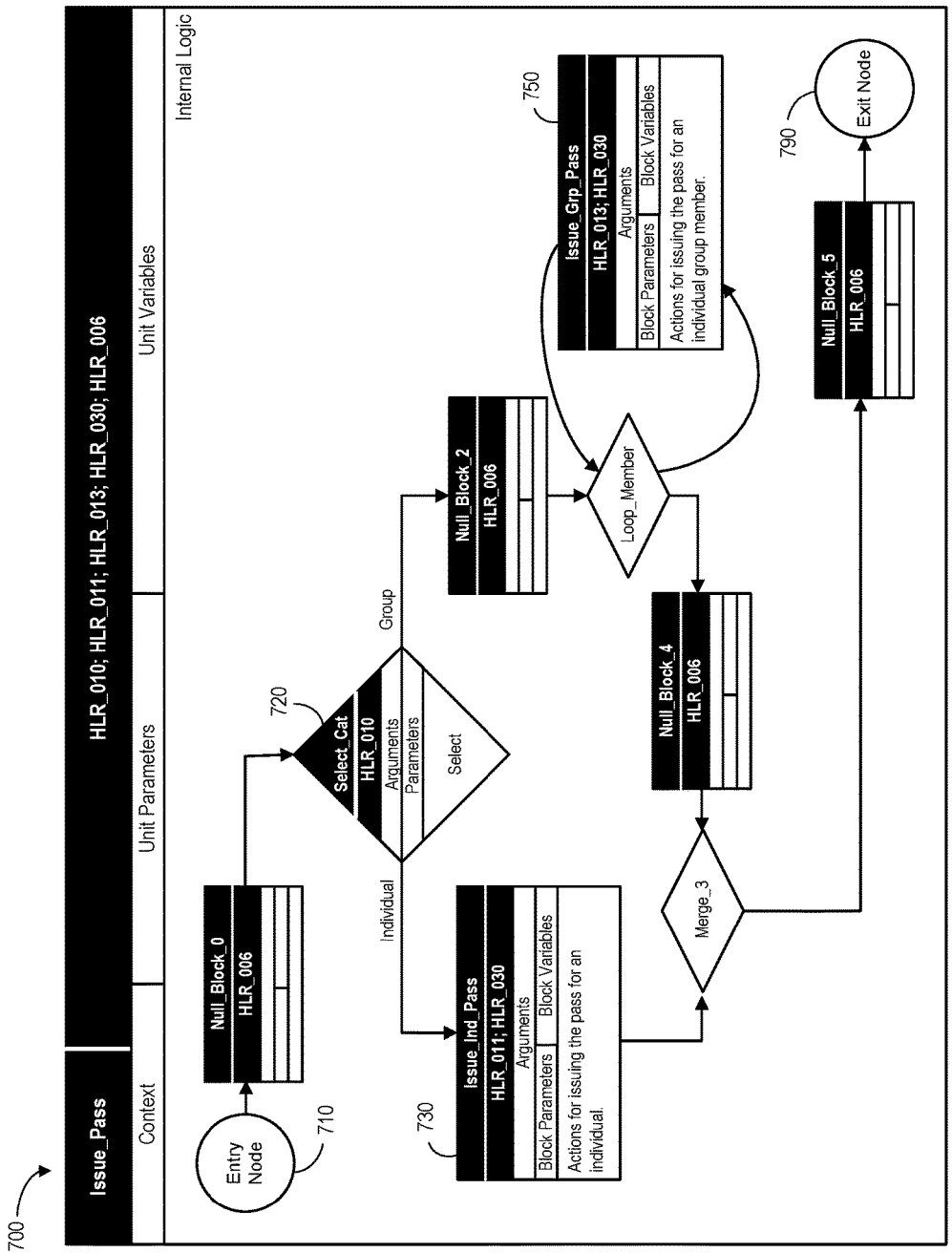
FIG. 7 is an internal logic model according to some embodiments.

Another view of this process is illustrated in FIG. 7, which sets forth internal logic for an "Issue_Pass" unit 700 in terms of low-level requirements in a software design. The internal logic of the unit Issue_Pass 700 is modeled by a control flow network connecting block entities. Note that the control flow network comprises an entry node 710, an exit node 790, and three control nodes. The Select_Cat control node 720 has the following explicit elements: a tag ("HLR_010"), arguments, parameters, and a decision control action to select which branch to be taken. Note that the Select_Cat control node 720 has an implicit empty node variable element (because a selection control normally does not require a local variable). Loop_Member is a loop control that may have all the elements as explicit, including a node variable to represent an iterator. Merge_3 is an implicit joint (merge) control node (meaning that except its identifier and at least one tag, all other elements are implicit). Elements of Loop_Member and Merge_3 are not shown to reduce clutter in FIG. 7. Each edge in the control flow network has a block entity, and there are six block entities in total. Issue_Ind_Pass 730 and Issue_Grp_Pass 750 have all the elements as explicit. The other four block entities have an implicit empty action element. These four block entities are named Null_Block_0, Null_Block_2, Null_Block_4, and Null_Block_5.

As illustrated in FIG. 7, low-level requirements may be expressed by the required functionalities, abstracted as block entities, which are represented by their explicit descriptive identifiers, and the logic behavior (abstracted as the control flow network) which are represented by explicit descriptive identifiers for each of the control nodes and the network topology connecting control nodes. If so desired, annotation elements can be included to provide further description for each of the explicit descriptive identifiers (but such annotations are not required). Instead, a data dictionary mechanism may be used to track the identifiers and provide additional description for each of the identifiers, either in a central database or in a distributed fashion. Guided by a defined software design standard, if the functionality or behavior of an entity is changed to a different scope, its explicit descriptive identifier may also be changed. In such a case, a defined software configuration management standard may require a new entity be created or be derived from the old entity, and the old entity be deprecated.

According to some embodiments, refinement of action details encapsulated within each entity may reflect implementation details. If requirements are not impacted by such implementation details, then the low-level requirements expressed by the model remains the same. The granularity of the model may thus be consistent with low-level requirements so that changes impacting requirements are accurately reflected. Consider, for example, the difference from a flat logic structure where the model granularity remains at same level across all block entities within the unit, nested block entities can be used to maintain consistency between model granularity and low-level requirements, and to increase the level of abstraction at the same time. In a nested block entity, its actions element contains a nested logic. A nested logic is the same as a normal logic described above. It is also modeled by a control flow network connecting regular block entities, except that its entry node coincides with the upper stream control node for the current block entity, and its exit node coincides with the downstream control node for the current block entity. Block entities inside a nested block entity may be further nested.

It should be noted that the nested logic of a nested block entity is still part of the internal logic of the current unit. This is different from the internal logic of a function called by a block entity. The internal logic of a function called by a block entity may instead be considered as belonging to a separate unit. Expanding the nested logic of a nested block entity into the internal logic of the parent unit may have no effect on the low-level requirements expressed by the model, or on the architecture of the software system. Conversely, abstracting and encapsulating a sub-part of the internal logic of the unit into a nested block entity may also have no effect on the low-level requirements expressed by the model, or on the architecture of the software system.

Note how identification tags of the Issue_Pass unit 700 of FIG. 7 may be used to maintain traceability to higher-level requirements. In particular, traceability to higher-level requirements may be maintained at the block entity level and the control node level. For example, block entity Issue_Ind_Pass has two tags, HLR_011 and HLR_030 that maintain traceability to high-level requirement 011 and high-level requirement 030. Block entity Issue_Grp_Pass has two tags, HLR_013 and HLR_030 that maintain traceability to high-level requirement 013 and high-level requirement 030. Similarly, control node Select_Cat has one tag, HLR_010, that maintains traceability to high-level requirement 010. Null_Block_0, Null_Block_2, Null_Block_4, and Null_Block_5 have one tag, HLR_006, that maintains traceability to high-level requirement 006. The notion is that block entities with an implicit empty action element are also traceable to higher-level requirements. Such block entities with an implicit empty action element will also enable model coverage and structure coverage instrumentation to be incorporated in generated code for simulation and testing purposes. According to some embodiments, identification tags of unit Issue_Pass do not provide independent information from identification tags of block entities and control nodes contained in the unit, nor do they provide duplicate information. They are simply references to all the identification tags from block entities and control nodes in the unit internal logic. The same rule may apply to nested block entities, where identification tags of the parent block entity may simply comprise references to all the identification tags from block entities and control nodes in the nested logic.

Using this method, expanding the nested logic of a nested block entity into the internal logic of the parent unit (and consequently eliminating the parent nested block entity itself) has no effect on the traceability to higher-level requirements and does not require any adjustments to the traceability maintained by block entities and control nodes in the nested logic. Conversely, abstracting and encapsulating a sub-part of the internal logic of the unit into a nested block entity has no effect on the traceability to higher-level requirements, and does not require any adjustments to the traceability maintained by block entities and control nodes to be encapsulated into the nested logic.

According to some embodiments, bi-directional traceability between higher-level requirements and low-level requirements and low-level design is maintained by an indexing or mapping method that traces all the entities (block entities and control nodes) that implement any given higher-level requirements. This approach may employ two kinds of mechanisms to maintain a high-to-low traceability index or map. A "registration" mechanism may be employed for efficient and reliable establishment of the mapping for individual entities. A "search and indexing" mechanism may be employed for establishing or refreshing the index or map periodically or at an event driven basis, such as after a major system update or architectural change.

Figure 8:
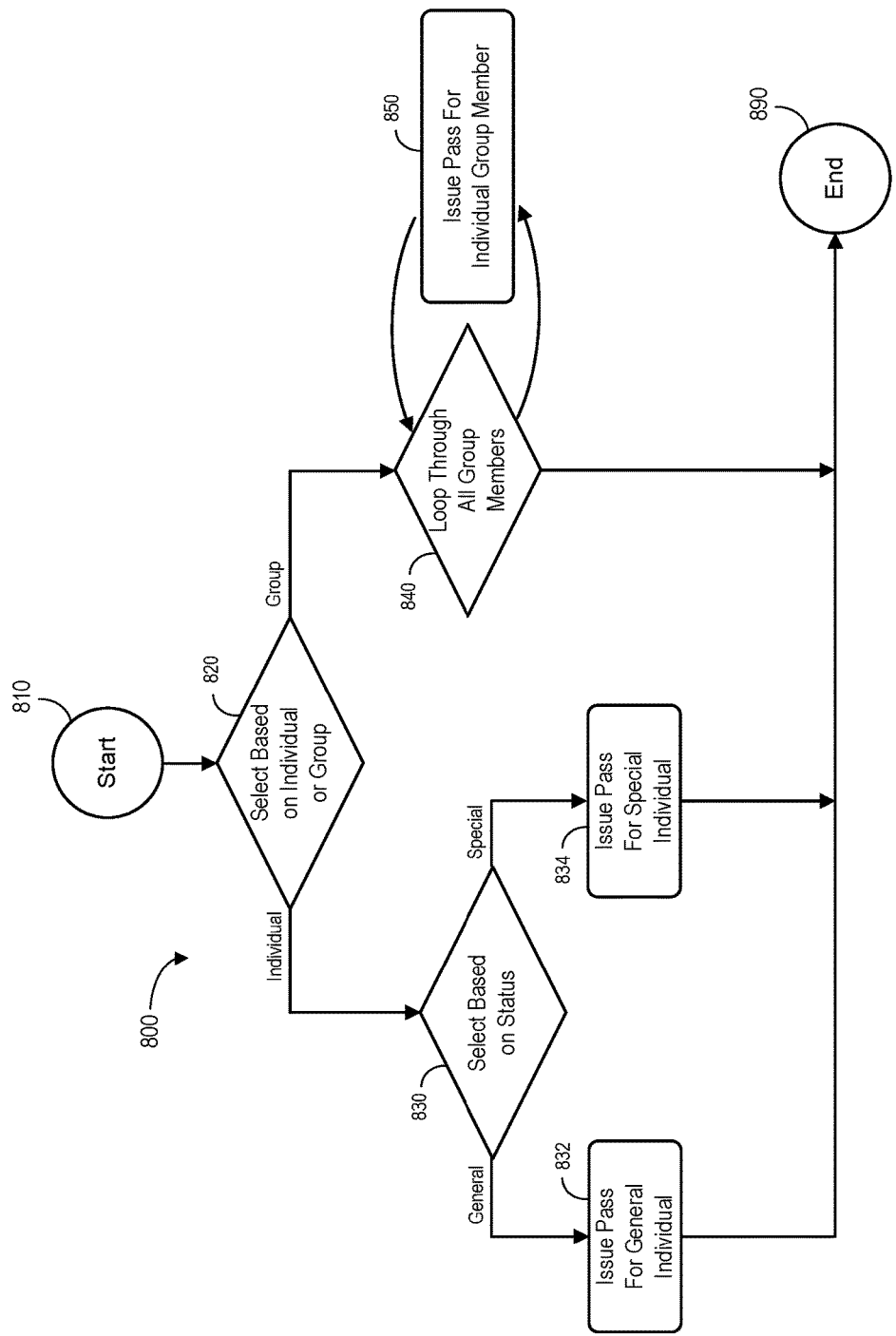
FIG. 8 illustrates issuing security passes with nested logic in accordance with some embodiments.

Some embodiments described herein may provide methods for expanding and abstracting nested block entities. To illustrate such features, the block "Issue pass for an individual" in the software logic depicted in FIG. 6 is expanded to show the nested logic as depicted by the process 800 of FIG. 8. The nested logic differentiates individuals by their categories, and issues security pass based on the category. As before, after starting at 810 the process 800 determines if an individual or group workflow should be initiated at 820. If an individual workflow is appropriate, either a general pass is issued at 830, 832 or a special pass is issued at 830, 834 and the process ends at 890. If a group workflow is appropriate, the process 800 loops through each member of the group at 840, issuing passes as appropriate at 850, before ending 890. Security passes for individuals in the group may be based on a group policy, thus it may not be necessary to differentiate if an individual in the group should be treated differently by their individual categories.

Figure 9:
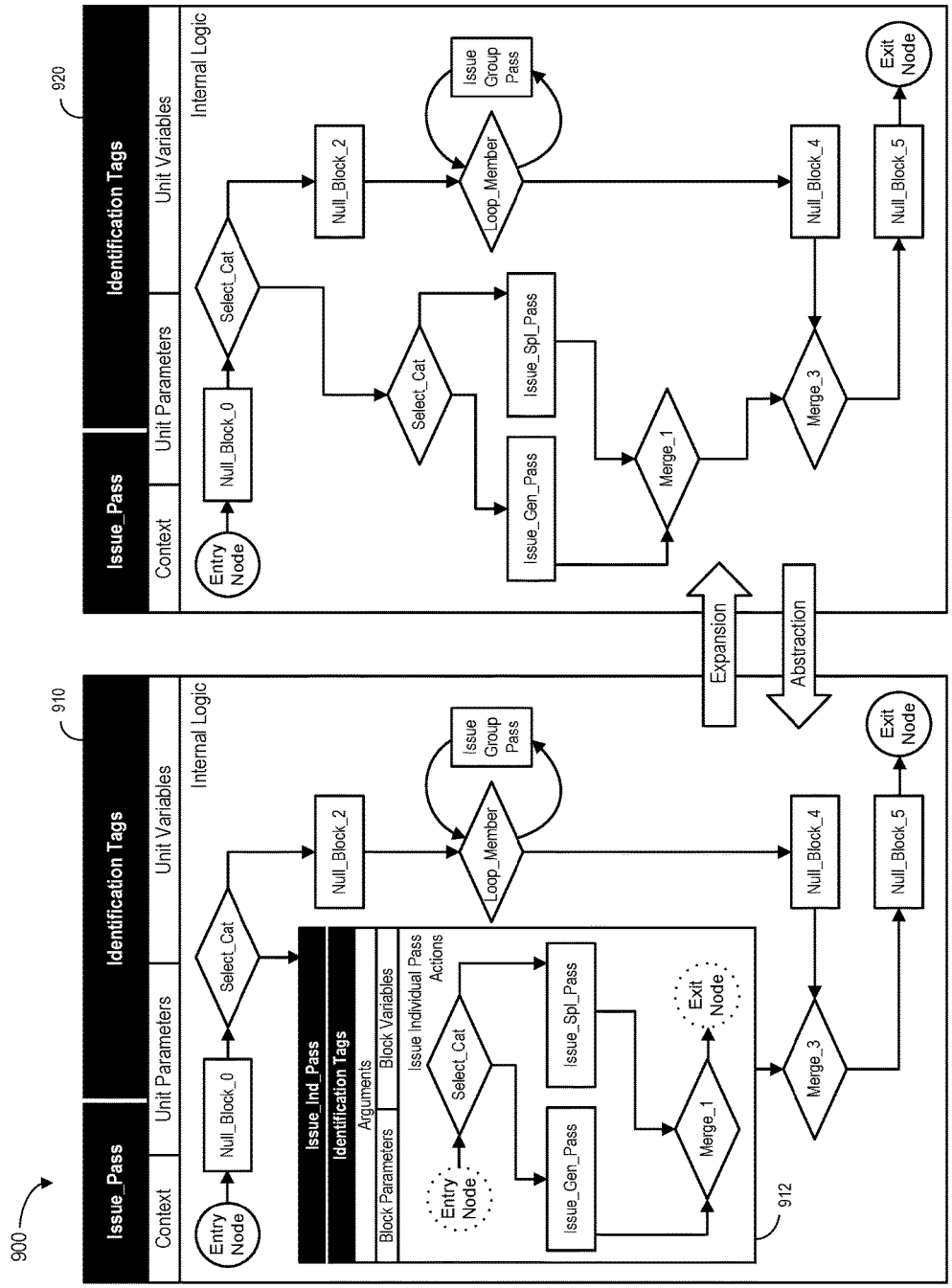
FIG. 9 is an example of expansion and abstraction for nested block entities according to some embodiments.

FIG. 9 illustrates "Issue_Pass" units 910, 920 associated with an expansion process and an abstraction process. As used herein, the term "expanding" may refer to the model transformation that removes an abstraction and encapsulation provided by a nested block entity and incorporates its nested logic directly into the internal logic of the current unit (from left to right in FIG. 9). Abstracting refers to the reverse process to encapsulate parts of the logic into a new nested block entity (from right to left in FIG. 9, creating "Issue_Ind_Pass" 912).

Figure 10:
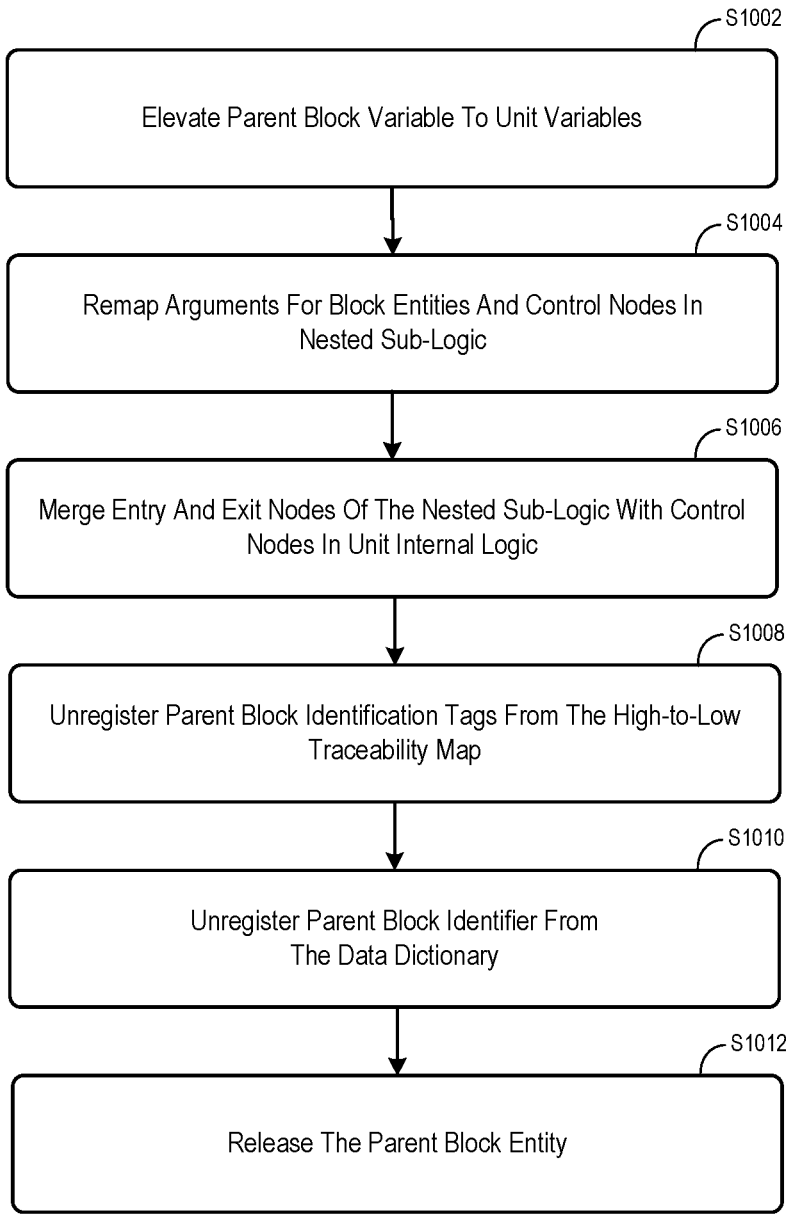
FIG. 10 is a method for expanding nested block entities in accordance with some embodiments.

A method for expanding nested block entities is depicted in FIG. 10. This figure shows how each of the elements of the parent block entity and each of the elements of block entities and control nodes in the nested sub-logic is handled during the transformation. A major effect of this transformation is that the nested sub-logic of the parent block entity is now exposed to unit parameters and unit variables after the transformation (and this may need to be properly addressed). At S1002, block variables in the parent block entity are elevated to unit variables. Any name collision identified in this process is resolved by modifying names of the elevated variables. Name collision is possible because block variables are assumed not visible outside the block. At S1004, arguments of block entities and control nodes in the nested sub-logic are remapped to existing unit parameters and unit variables, and those new unit variables elevated from block variables of the parent block entity. Mapping to existing unit parameters and unit variables is achieved by directly connect those arguments to existing unit parameters and unit variables via the relationship originally maintained by block parameters of the parent block entity. Once this mapping is done, block parameters of the parent block entity are bypassed and are no longer needed. Mapping to new unit variables that are elevated from block variables of the parent block entity is achieved by simply retaining the original relationship. Note that identification tags, block parameters, block variables, and actions or decision control actions of block entities and control nodes in the nested sub-logic remain the same, and no changes are needed. Thus some embodiments described herein may enable efficient automation to be used in the transformation while maintaining low-level requirements expressed in the model and traceability to higher-level requirements. At S1006, the entry node of the nested sub-logic is merged with the immediate upstream control node of the parent block entity. The exit node of the nested sub-logic is merged with the immediate downstream control node of the parent block entity. Because the entry node and the exit node of the nested sub-logic are essentially virtual control nodes, the merge is achieved by simply connecting the nested sub-logic to the unit internal logic. At S1008, identification tags of the parent block entity are unregistered from the high-to-low requirement traceability map. Because traceability is maintained at block entity control node level, this step has no impact on traceability. At S1010, the parent block identifier is unregistered from the data dictionary, if a data dictionary is used to track block identifiers. Because the functionality represented by the nested sub-logic becomes a direct part of the internal logic of the unit, the block identifier of the parent block entity is no longer needed. At S1012, the parent block entity may be released.

Figure 11:
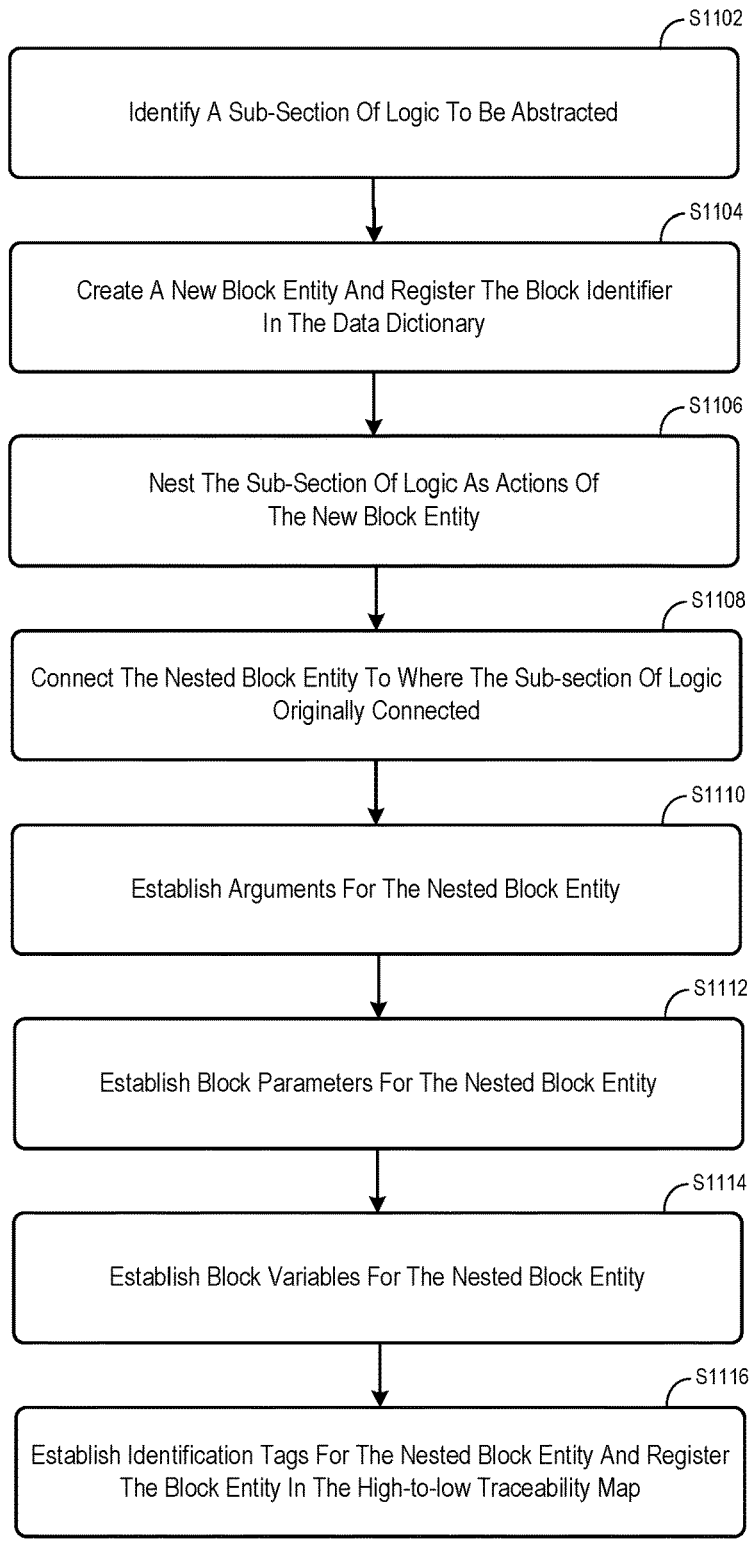
FIG. 11 is a method for abstracting nested lock entities according to some embodiments.

A method for abstracting nested block entities is depicted in FIG. 11 which shows how each of the elements of the new nested block entity and the sub-section of unit internal logic to be transformed into the nested sub-logic is handled during the transformation. At S1102, a sub-section of the unit internal logic is identified for abstraction. This is essentially an application specific decision. It is required that the sub-section of logic has only one incoming connection and only one outgoing connection to the rest of the control flow network. The incoming edge and the outgoing edge shall be included as part of the sub-section. At S1104, a new block entity is created. An explicit descriptive block identifier is created based on the intended functionalities to be nested in the new block entity. The new block entity will serve as an abstraction of the functionalities to be nested. If a data dictionary is used to track block identifiers, the new block identifier is registered in the data dictionary. At S1106, the identified sub-section of unit internal logic is nested into the new block entity as its actions. The start point of the incoming edge and the end point of the outgoing edge of the sub-section of logic become the entry node and the exit node of the nested sub-logic, respectively. Note that identification tags, block parameters, block variables, and actions or decision control actions of block entities and control nodes in the nested sub-logic remain the same, thus no changes are needed. Thus, some embodiments described herein may enable efficient automation to be used in the transformation while maintaining low-level requirements expressed in the model and traceability to higher-level requirements. At S1108, the nested block entity is connected to the immediate upstream control node and the immediate downstream control node where the nested sub-logic originally connected to the rest of the unit internal logic. At S1110, arguments of the nested block entity are established by aggregating arguments of block entities and control nodes in the nested sub-logic. At S1112, block parameters of the nested block entity are established by direct one-to-one mapping of the arguments established in the previous step. This may help keep the interface of the nested sub-logic unchanged during the transformation. At S1114, unit variables that are only intended for use by the nested sub-logic, thus are only referenced by the nested sub-logic, are downgraded to block variables of the nested block. Block arguments and block variables of the nested block entity corresponding to the downgraded block variables are removed because they no longer serve any purpose. Additionally, post transformation design activities may be initiated to further adjust or modify the nested block entity. As a temporary transformation for trying different abstraction options, or if so desired, this unit block variable downgrade step may be skipped during the process. A dedicated post transformation unit variable downgrading process could be employed to achieve the same effect. At S1116, identification tags of the nested block entity may be established by reference to identification tags of block entities and control nodes in the nested sub-logic. The nested block entity is registered in the high-to-low requirement traceability map for each of the traced requirements to ensure up to date bi-directional traceability for the newly created nested block entity.

Note that abstraction can also be applied to control nodes to model any arbitrary control structure, including those not supported by existing programming languages. In this case, a nested control node's actions element is no longer limited to control decision actions. Complex control decision logic involving the use of actions other than decision control actions may be used.

Figure 12:
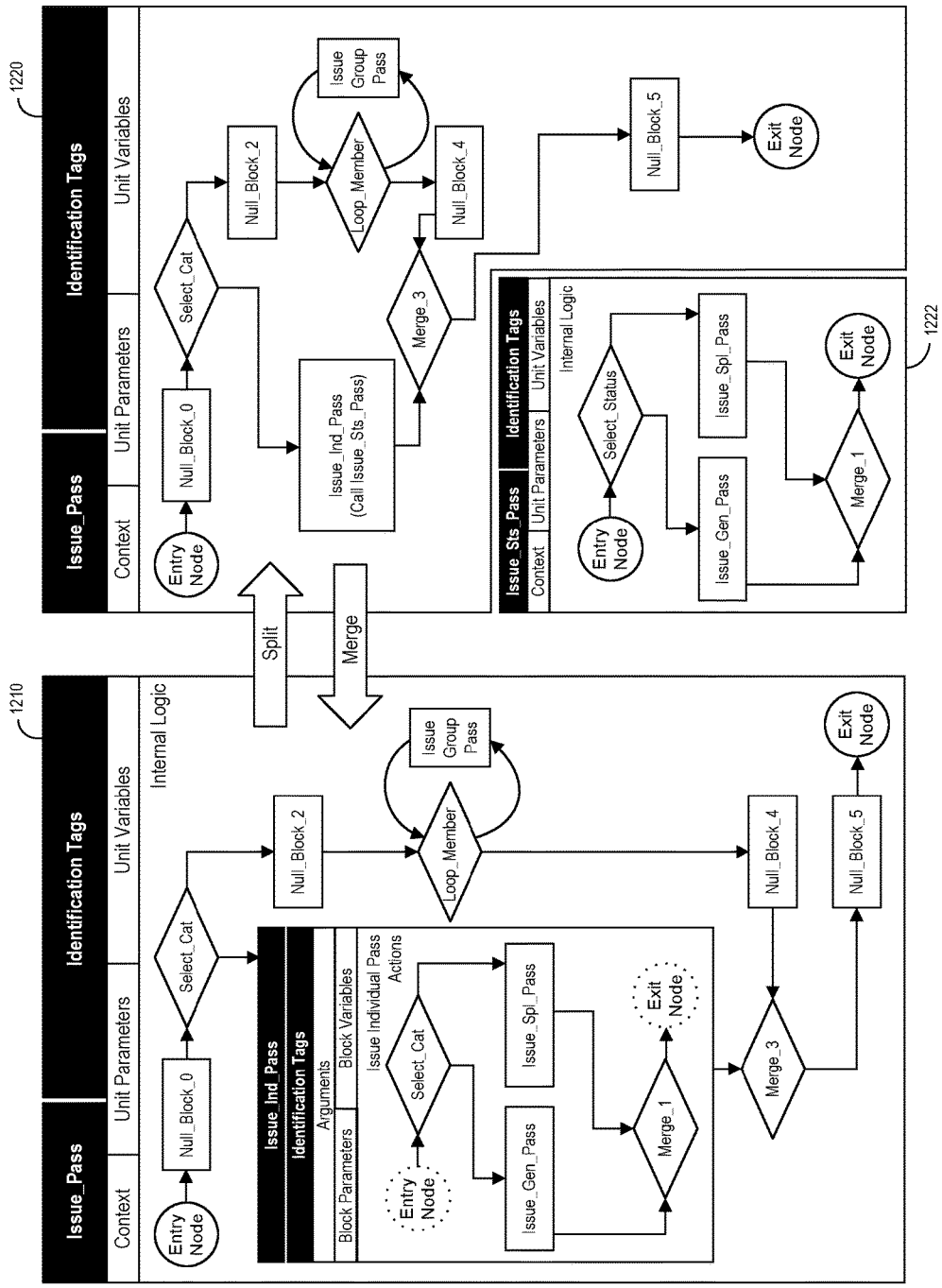
FIG. 12 is an example of splitting and merging units in accordance with some embodiments.

FIG. 12 illustrates "Issue_Pass" units 1210, 1220 associated with a splitting process and a merging process. Note that multiple separate, individual units may be modeled using the same methods for modeling a single unit as separate processes, either in a parallel or a sequential fashion. FIG. 12 shows how related units can be modeled as a single process, more specifically, how a single unit can be transformed into multiple units and how multiple units can be transformed into a single unit (e.g., associated with "Issue_Sts_Pass" 1222). As used herein, the term "split" may refer to the model transformation that divides a single unit into two or more units (from left to right as shown in FIG. 12). The term "merge" may refer to the reverse process to combine two or more units into a single unit (from right to left in FIG. 12). By definition, these processes may result in architecture changes. Newly created units may become accessible outside the original unit. Old units combined into the combined unit may be no longer accessible from outside the combined unit. Split and merge may be achieved through additional steps built around the methods for expanding and abstracting nested block entities.

Figure 13:
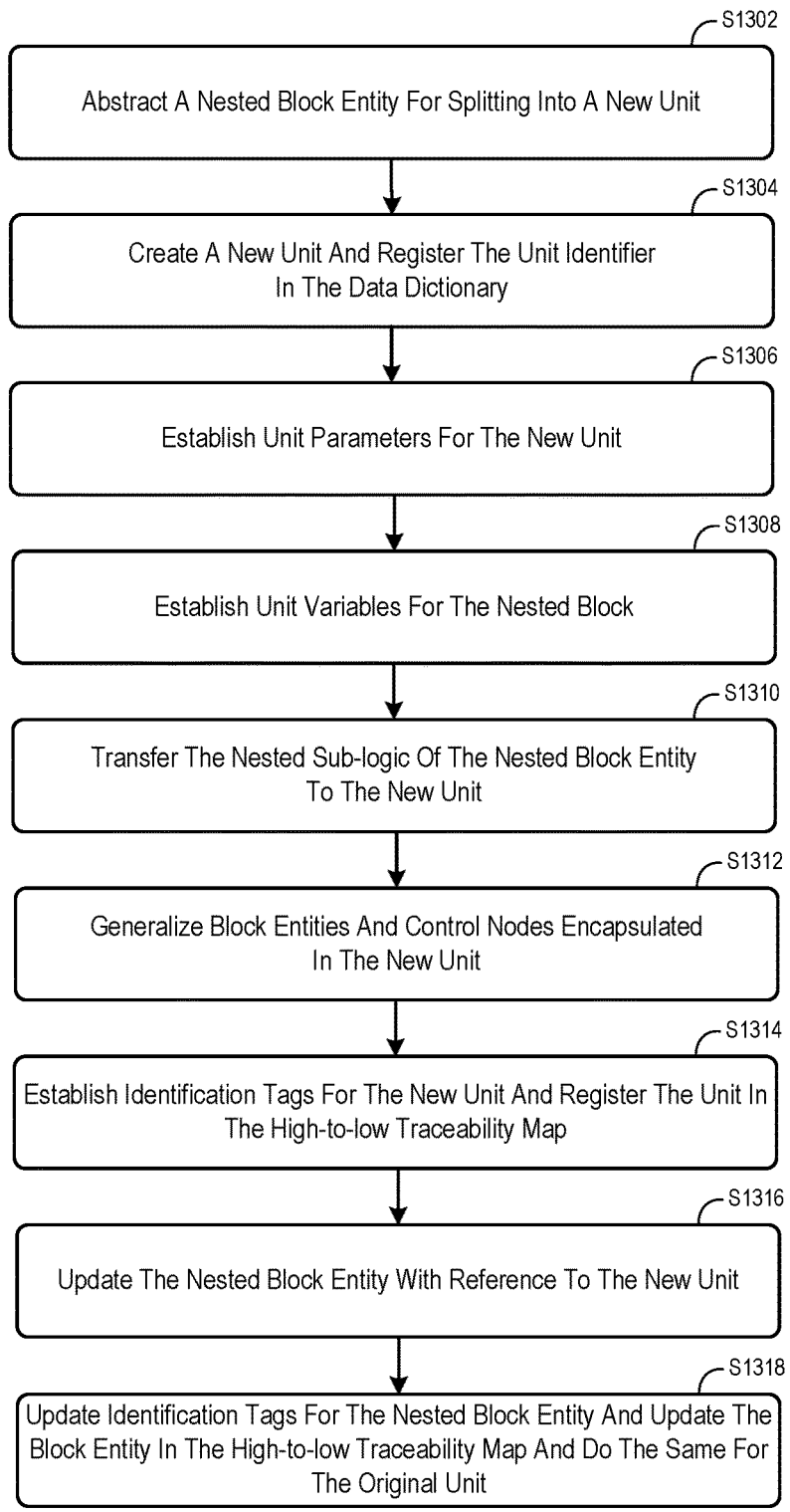
FIG. 13 is a method for splitting a unit according to some embodiments.

A method to split a unit is depicted in FIG. 13 showing how each of the unit elements of a new unit split from an original unit is handled during the transformation. At S1302, a nested block entity is abstracted in the original unit, following the method for abstracting described earlier, if a nested block entity does not exist for the sub-section of logic to be split into a new unit. At S1304, a new unit is created. An explicit descriptive unit identifier is created based on the intended functionalities to be encapsulated in the new unit. The unit identifier is a more generalized derivative of the nested block entity identifier in that the environmental context of the nested block identifier shall be de-identified. For example, if the block identifier of the nested block entity is Calculate_Area_of Window, the unit identifier could be Calculate_Area_of_Rect, implying that the unit can be used to calculate the area of any plane objects that are rectangular in shape. The generalization is only needed if the intention of the transformation is to reuse the sub-logic as a unity to support multiple units. If a data dictionary is used to track unit identifiers, the new unit identifier is registered in the data dictionary. At S1306, unit parameters of the new unit are established by populating block parameters of the nested block entity. At S1308, unit variables of the new unit are established by populating block variables of the nested block entity. At S1310, the nested sub-logic of the nested block entity is transferred to the new unit as its internal logic. The entry node and the exit node of the nested sub-logic of the nested block entity become the entry node and the exit node of the new unit. At S1312, block identifiers are generalized and identification tags are remapped for block entities and control nodes in the transferred internal logic of the new unit. Generalization and remapping are only needed if the intention of the transformation is to reuse the sub-logic as a unity to support multiple units. If this is indeed the case, then the purpose of generalization and remapping is to remove reference to higher-level requirements specific to the environmental context that has been di-identified. If each of the block entities and control nodes in the original nested sub-logic were already generalized, by making best use of block argumenta and block parameters to isolate block actions from the environmental context, then the current step becomes unnecessary (this may be the standard practice). Thus, some embodiments described herein may enable efficient automation to be used in the transformation while maintaining low-level requirements expressed in the model and traceability to higher-level requirements. Note that block parameters, block variables, and actions or decision control actions of block entities and control nodes in the transferred internal logic of the new unit may remain the same, no changes are needed. Although, post transformation design activities may be initiated to adjust or modify the naming of these elements, along with any other desired changes. If human intervention is needed in this step, the relevant elements may be automatically annotated to ensure consistent actions are taken. At S1314, identification tags of the new unit are established by referencing to identification tags of block entities and control nodes in its internal logic. The unit is registered in the high-to-low requirement traceability map for each of the traced requirements to establish bi-directional traceability for the newly created unit. At S1316, block variables of the nested block entity in the original unit are removed because they are no longer needed. Actions of the nested block entity are replaced with a reference to the new unit. Arguments of the nested block entity remain the same. At S1318, identification tags of the nested block entity are updated to reflect the delegation of functionalities encapsulated in the new unit. At the same time, identification tags of the original unit are updated to reflect the same. Particularly, only environmental context specific requirements are retained. Entries of the nested block entity in the high-to-low requirement traceability map are updated.

Figure 14:
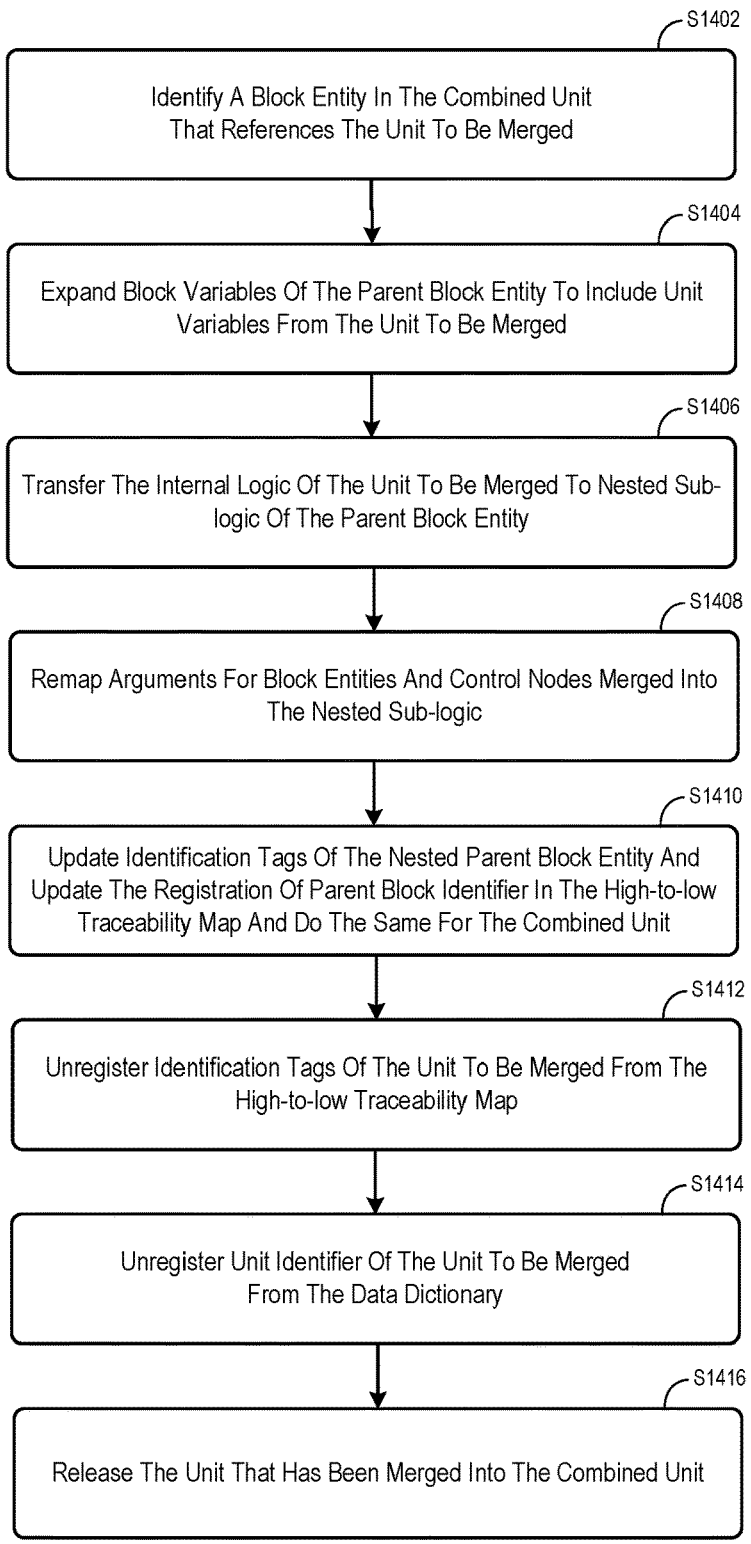
FIG. 14 is a method for merging a unit in accordance with some embodiments.

A method for merging units is depicted in FIG. 14 which shows how one unit may be combined into another unit as a nested block entity in the latter. The first unit is referred to as the unit to be merged, and the second unit is referred to as the combined unit. An arbitrary merge can always be achieved through the use of one-to-one merge, along with necessary steps to split a parent unit to create a completely new combined unit to encapsulate the arbitrary merge, if a direct one-to-one merge does not meet the modeling needs. At S1402, a block entity in the combined unit that references the unit to be merged is identified. This block entity is referred to as the parent block entity. It becomes a nested block entity after the transformation steps described blow. If the unit to be merged is referenced by multiple block entities, this method can be applied to each of such block entities, each of the parent block entities. At S1404, block variables of the parent block entity are expanded to include unit variables from the unit to be merged. Any name collision identified in this process is resolved by modifying names of the merged unit variables. Name collision is possible because block variables and unit variables are assumed not visible outside these entities themselves. At S1406, the internal logic of the unit to be merged is transferred to the parent block entity in the combined unit as nested sub-logic. This is achieved by replacing the reference to the unit to be merged with the internal logic of that unit. An entry node and an exit node are concatenated to the newly combined nested sub-logic. At S1408, arguments of block entities and control nodes in the nested sub-logic are remapped to existing block parameters and block variables of the parent block entity. This mapping is achieved via arguments originally passed to the unit to be merged before the merge, and via any adjustments made during the block variable name collision resolution. Block parameters, block variables, and actions or control decision actions of block entities and control nodes in the nested sub-logic remain the same as they have already been isolated from the environmental context by the way of their arguments. Low-level requirements and low-level design expressed by block entities and control nodes merged into the parent block entity also remain the same. At S1410, identification tags of the nested parent block entity are updated to include references to identification tags of block entities and control nodes merged into the nested sub-logic. Identification tags of the nested parent block entity now include traceability to both context specific requirements and requirements previously addressed by the unit now merged into the nested block entity. The registration of the parent block identifier is updated in the high-to-low requirement traceability map to maintain the integrity of the bi-directional traceability. At the same time, identification tags and the registration of the merged unit are also updated. At S1412, identification tags of the unit to be merged are unregistered from the high-to-low requirement traceability map, if all the identified parent block entities in the combined unit, as well as in any other unit, are transformed following the above steps. At S1414, the unit identifier of the unit to be merged is unregistered from the data dictionary, if a data dictionary is used to track unit identifiers. Because the functionality represented by the unit to be merged becomes part of nested parent block entity in the internal logic of the combined unit, the unit identifier of the unit to be merged is no longer needed. At S1416, the unit that has already been merged into the combined unit may be released. Through these steps, the unit to be merged is transformed into part of the nested sub-logic of the nested parent block entity. If so desired, the nested parent block entity can be further expanded as a direct part of the internal logic of the combined unit in accordance with the method described earlier. For a particular parent block entity, only a portion of the logic flow network in the unit to be merged (the first unit) may ever be traversed. Thus, steps S1404, S1406, and S1408 may only involve those items that are relevant to the portion of the logic flow network in the first unit. The software design decision may be to merge the unit into some of the parent block entities, but not others. Thus, steps S1412, S1414, may S1416 may be skipped because the unit that has been merged into some block entities are still referenced by some other block entities.

Figure 15:
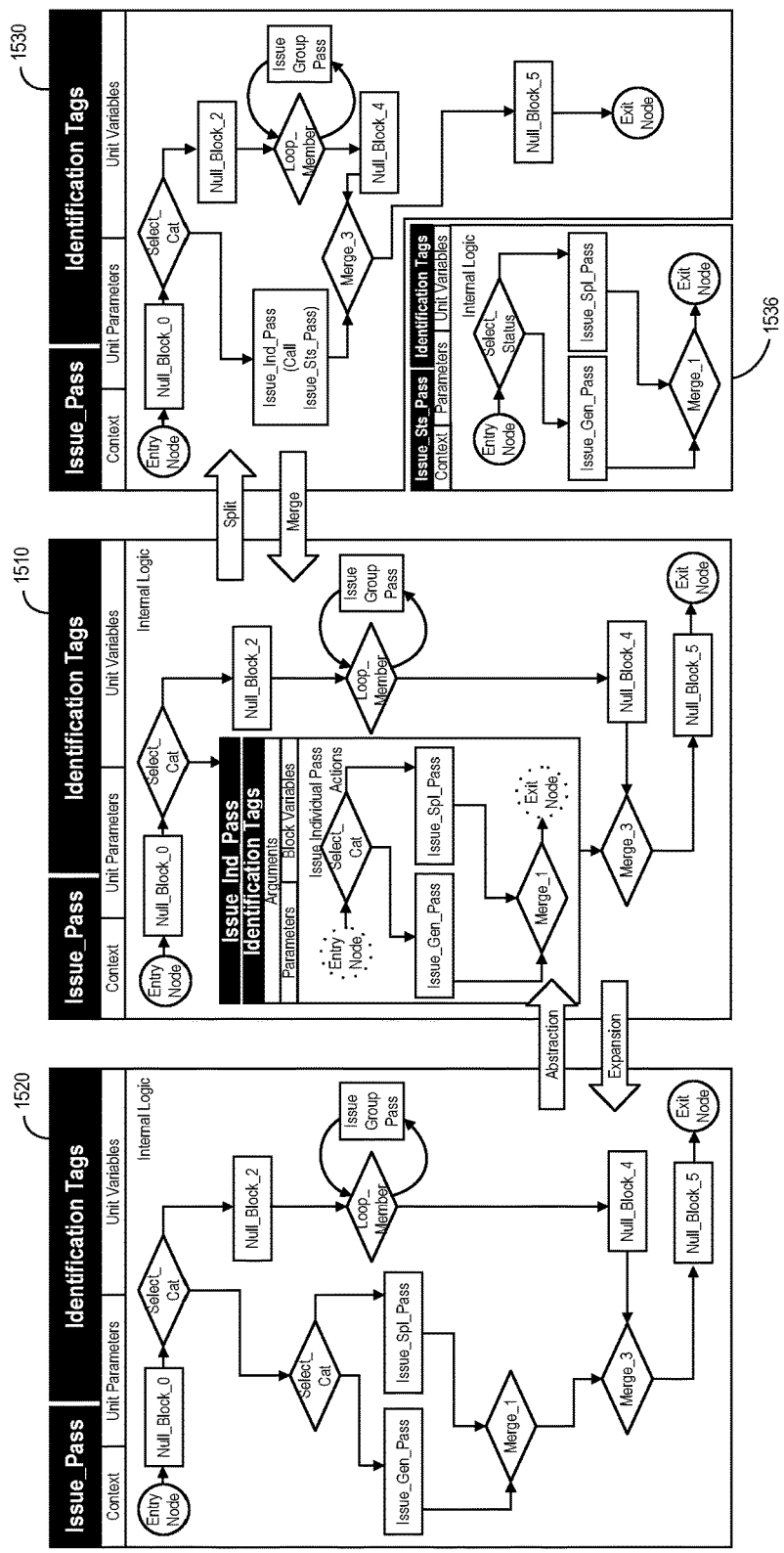
FIG. 15 is a chain of model unit processes according to some embodiments.

A chain of model unit transformation processes described by the methods for expansion, abstraction, split, and merge is illustrated in FIG. 15. In particular, FIG. 15 illustrates a unit 1510 that is abstracted into another unit 1520 and then split into still two other units 1530 and 1536. Likewise, that units 1530 and 1536 may be merged to create 1520 and then expanded to return to the original unit 1510.

FIG. 3, FIG. 4, FIG. 5, FIG. 7, FIG. 9, and FIG. 12 provide exemplar graphic representations of model entities and complete models in accordance with embodiments described herein. Systems and computer tools embodying such embodiments may use a variety of styles and different levels of abstraction to graphically represent a model at different stages of the modeling process. Models are also represented using explicit model notation other than graphics to store model design information as software development artifacts, as the final product, as intermediate data during live modeling process, or as messages to be exchanged in a networked, distributed modeling environment. Note that some embodiments described herein may be associated with methods to represent a model in different formats. The model may be represented, for example, by metaclasses that are used to represent complete information of block entities, control nodes, and logic flow network links. The model may be directly analyzed by directly accessing metaclass properties to check for potential errors or consistency. Graphical representations, for example logic flow diagrams, may be rendered for viewing the underlying model by a human developer. Software code may be generated and compiled into target object code for execution, and/or for human developer to review or test.

Alternatively, if the programming language is preselected, the model may be directly represented by software code following strictly predefined coding standards. By way of example, a block entity might be represented by the following Ada code block:

```
Issue_Gen_Pass:
--| Issue pass for a general individual
--| Requirement Satisfied:: HLR_011; HLR_30
    declare
        Pass_Buffer : General_Pass_Type
    begin
        Pass_Buffer.Name := Visitor_Name;
        Pass_Buffer.Date := Clock.Current_Date;
        Pass_Buffer.Expiration := Expiration_Time;
        Issue_Pass(Pass_Buffer);
    end Issue_Gen_Pass;
```

In this example, the block identifier is "Issue_Gen_Pass." Identification tags HLR_011 and HLR_30 are used to explicitly maintain traceability to the higher-level requirement. Block input arguments include Visitor_Name and Expiration_Time. In this example, block parameters become implicit (i.e., they are short circuited by block arguments) to avoid extra assignment statements. An issue with this short circuiting is the additional overhead associated with automated model transformation. Note that there is only one block variable Pass_Buffer. Block actions include those setting up the pass buffer and call function Issue_Pass to have the actual pass issued. Similar to the block entity example, control nodes may also be directly represented by software code following strictly defined software standards.

As another example, the following might map legacy code blocks to block entities:

```
--| Gather airport information
Data_Base.Read
    ( Index       =>   Airport_Index,
                                -- Previously identified index as input
      Data        =>   Airport_Data );
                                -- Obtained airport information as output
--| Search for the runway based on the runway
--| identifier and the airport information.
Runway_Buffer := Search_for_Runway
    ( Runway_Record       =>   Airport_Data.Runway_Record,
                                -- Airport runway record as input
      Key                 =>   Runway_ID );
                                -- Previously provided ID as input
--| Extract the runway information, if the runway is found
--| for the specific airport.
if Runway_Buffer.Found then
    Data_Base.Read
        ( Index       =>   Runway_Buffer.Index,
                                -- Runway index as input
          Data        =>   Runway_Data );
                                -- Obtained runway information as output
end if;
```

Note that in the example above each portion of the code block starting with comment lines indicated by the special sequence "--|" may comprise a block entity. Comment lines indicated by the standard sequence "--" may serve as regular annotations within a block entity. Descriptive block entity identifiers may be created based on the comments indicated by the special sequence "--|" (e.g., "Gather_Airport_Info," "Search_For_Runway," "Extract_Runway_Info"). Identification tags for these block entities may be established from the requirement traceability of the unit, with human intervention if necessary. Other items for the block entities may be established following the previous example. Note that the block entity "Extract_Runway_Info," directly mapped from the last code block in the example, will be a nested block entity because it contains nested logic flow. This block entity may be expanded to establish a flat logic unit. If the logic flow in the model unit has not been changed after the mapping (i.e., model extraction), the reverse mapping from model to newly generated code will yield code blocks implementing the same logic. However, each of the code blocks will be generated with proper block entity items, including identification tags that were not in the legacy code, among other items.

Traditionally, in the function or unit header, comments are often used to describe the logic flow in natural language. One problem with the traditional approach is the physical distance between the logic description and the actual code lines. This distance increases the difficulty for keeping the description and code synchronized. It also increases the difficulty for reviewing the code design and for analyzing the code design. These difficulties often tend to lead to diversion between the logic description and actual code implementing the logic. In representing the model using software code, embodiments may address this problem by placing the logic description at the location of the actual code. A code editing tool may then show different levels of details of the code. For example, a developer might completely hide the code (and only show comments and tags) which would be analogous to a conventional file header logic description. The specification of requirements may be pulled from specification model and shown in the code view but not stored in the code file, or the specification of requirements may be automatically inserted in the code file as part of the code file content. Then, only code for control entities are shown (along with tagged comments) which would be analogous to some sort of pseudo code. All code lines may also be made visible, just like a conventional code file. Traceability to high level requirements is always embedded in block entities and control nodes. Another method is to only show code, without any comments. This may be beneficial to an experienced programmer who wants to optimize the code manually. Although representing the model with software code is possible, given the additional overhead associated with direct model analysis and model transformation, the metaclass representation might be a preferable model representation when possible.

The methods for representing the model as metaclasses and software code may provide a way to maintain mapping between a model represented as metaclasses and software code. This can be extended to automatically extract model from legacy software source code. A list (a map with search tree) may be established to search for code language syntax to identify block entities and control nodes. This extraction method can be expanded with new features or for different programming languages by establishing a generic list structure, and then derived or instantiated to create mapping for a specific programming language or application code base.

Once the model is extracted and stored in the database, it can then be directly analyzed and enhanced to form the new underlying model for the software system. According to some embodiments described herein, logic flow may be explicitly represented by block entities and the control flow network. As such, the traceability between model elements and software code can be explicitly maintained. This enables full model coverage test through simulation with simulation execution of each block entity (including empty block entities). Code structure coverage test and model coverage test may be achieved at the same time.

The differentiation between formal parameters and actual arguments for block entities and control nodes allows for variable names being changed in the unit without changing the representation of the logic in the model. For example, in a given problem domain, algorithms are normally represented by equations using established nomenclature. Such nomenclature cannot be easily used as is in software code, mainly due to attempts to avoid variable naming collision. Differentiating formal parameters and actual arguments decouples model representation and software code, while still maintaining explicit traceability between the two. The differentiation also enables easy transformation between a code block and a function. Or it may enable a unit with its internal logic represented by block entities and logic flow control network in one code generation configuration, and a collection of small and simple units in another code generation configuration. Each of these two different software code configurations may have their merits under different circumstances. This might be appropriate for a lone-live product line with multiple product variations released over the history of the product line that still needs to be maintained.

Note that the unit split and merge achieved through expanding and abstracting nested block entities can be realized in generated code as conversions between block of statements to functions/procedures, inline functions, and/or local functions.

The methods for expanding and abstracting nested block entities depicted in FIG. 9, FIG. 10, and FIG. 11 and the methods for modeling multiple units, depicted in FIG. 12, FIG. 13, and FIG. 14 can be used during model extraction and code generation as ways to re-organize unit or block entity level local variables, such that they can be re-arranged to match specific programming language feature and style. For example, all local variables can be declared at the beginning of the unit regardless within which block entities they are used, or, local variables can be declared where it is first used.

As used herein, the term "component" may refer to a method to achieve required logic (which could be implemented as computer software in a hardware system). A particular implementation, however does not have to be partitioned in the matter to components are described. Note that embodiments described herein may be implemented as model-based software design computer systems hosted by a single computer or distributed computers interconnected by a network. In some embodiments, the methods provide a set of functionalities for model-based design. Each of the methods may be built as a component of the overall computer system, and assembled and connected, either as software running on the same computer or over a plurality of distributed computers to form the system. Industry standards, such as Unified Modeling Language ("UML"), Object Management Groups ("OMGs") MetaObject Facility, OMGs eXtensible Markup Language ("XML") Metadata Interchange, along with others, may be used to interface with different software engineering tools.

Moreover, embodiments described herein may be implemented as model-based software design computer tools. In such embodiments, one or more methods may provide the functionality for a standalone component tool. Such a component tool can be executed to read, process, and save model information in a local or networked computer storage media. Such a component tool can be executed to retrieve from, process, and distribute to other locally hosted or remotely hosted tools to achieve complete model-based design tasks. Industry standards, such as UML, OMGs MetaObject Facility, OMGs XML Metadata Interchange, along with others, may be used to interface with the storage media or other model-based design tools. Alternatively, proprietary interface may be used if justified.

Figure 16:
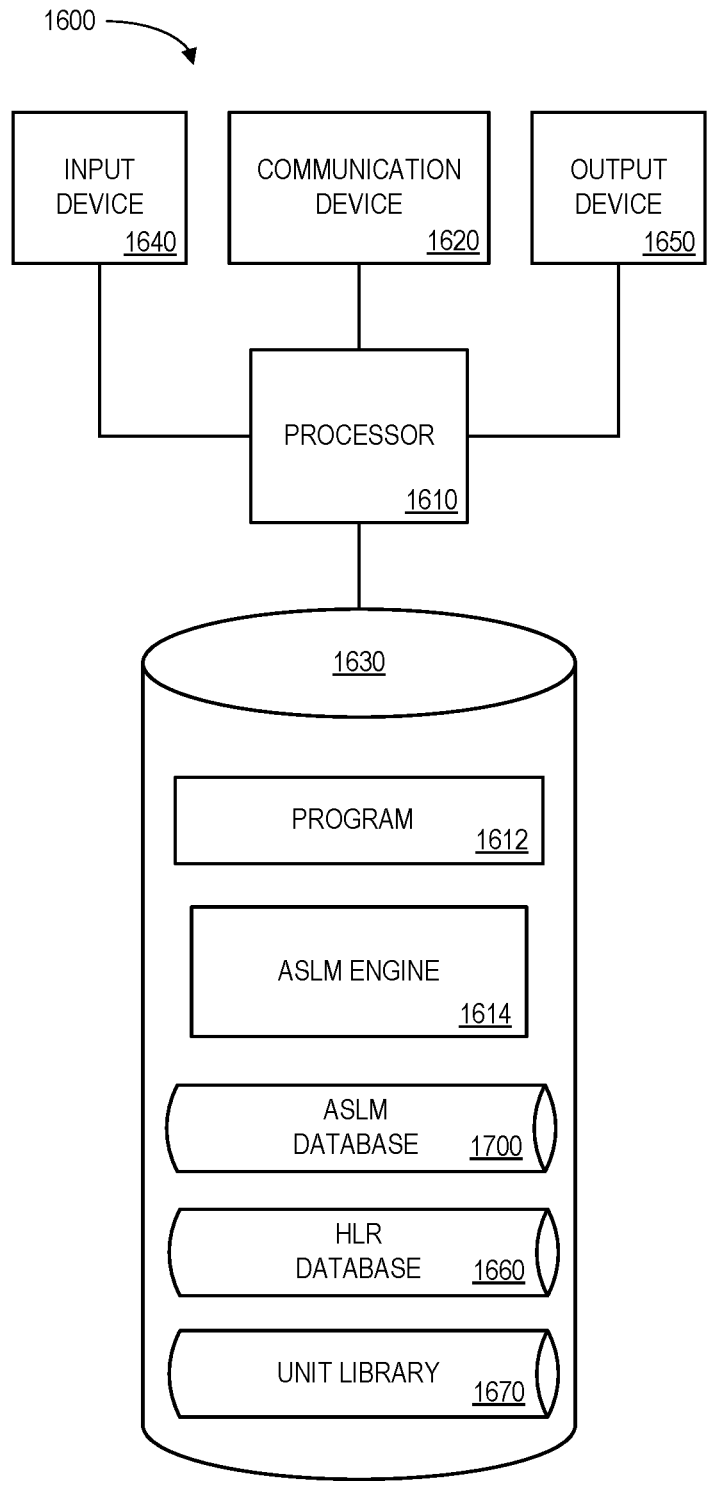
FIG. 16 is a block diagram of an apparatus or platform according to some embodiments.

The embodiments described herein may be implemented using any number of different hardware configurations. For example, FIG. 16 is a block diagram of an ASLM platform 1600 that may be, for example, associated with the system 100 of FIG. 1. The ASLM platform 1600 comprises a processor 1610, such as one or more commercially available Central Processing Units ("CPUs") in the form of one-chip microprocessors, coupled to a communication device 1620 configured to communicate via a communication network (not shown in FIG. 16). The communication device 1620 may be used to communicate, for example, with one or more remote administrator terminals, user platforms, etc. The ASLM platform 1600 further includes an input device 1640 (e.g., a computer mouse and/or keyboard to input modeling or code information) and/an output device 1650 (e.g., a computer monitor to render a display, create reports, etc.). According to some embodiments, a mobile device and/or PC may be used to exchange information with the ASLM platform 1600.

The processor 1610 also communicates with a storage device 1630. The storage device 1630 may comprise any appropriate information storage device, including combinations of magnetic storage devices (e.g., a hard disk drive), optical storage devices, mobile telephones, and/or semiconductor memory devices. The storage device 1630 stores a program 1612 and/or ASLM engine 1614 for controlling the processor 1610. The processor 1610 performs instructions of the programs 1612, 1614, and thereby operates in accordance with any of the embodiments described herein. For example, the processor 1610 may access an ASLM data source containing electronic records associated with units, each electronic record including a unit identifier, one or more identification tags, context data, unit parameters, unit variables, and internal logic. The processor 1610 may express system requirements at a logic block level and establish the logic blocks as self-contained entities and connections in accordance with the system requirements (the established logic blocks graphically representing systems logic). The processor 1610 platform may then explicitly transform the systems logic automatically to output language agnostic common design information exchange model information. The processor 1610 platform may also translate and maintain traceability among the system requirements, common design information exchange model information, and generated code.

The programs 1612, 1614 may be stored in a compressed, uncompiled and/or encrypted format. The programs 1612, 1614 may furthermore include other program elements, such as an operating system, clipboard application, a database management system, and/or device drivers used by the processor 1610 to interface with peripheral devices.

As used herein, information may be "received" by or "transmitted" to, for example: (i) the ASLM platform 1600 from another device; or (ii) a software application or module within the ASLM platform 1600 from another software application, module, or any other source.

In some embodiments (such as the one shown in FIG. 16), the storage device 1630 further stores an ASLM database 1700, an HLR database 1660 (e.g., containing a set of high level requirements that must be satisfied), and a unit library 1670 (e.g., containing software units that might be re-used by other developers). Example of databases that may be used in connection with the ASLM platform 1600 will now be described in detail with respect to FIG. 17. Note that the database described herein is only an example, and additional and/or different information may be stored therein. Moreover, various databases might be split or combined in accordance with any of the embodiments described herein.

Figure 17:
FIG. 17 is a tabular portion of an arbitrary software logic modeling database in accordance with some embodiments.

Referring to FIG. 17, a table is shown that represents the ASLM database 1700 that may be stored at the ASLM platform 1600 according to some embodiments. The table may include, for example, entries identifying components associated with an electric power grid. The table may also define fields 1702, 1704, 1706, 1708, 1710 for each of the entries. The fields 1702, 1704, 1706, 1708, 1710 may, according to some embodiments, specify: an ASLM identifier 1702, identification tags 1704, context 1706, unit parameters and variables 1708, and internal logic 1710. The ASLM database 1700 may be created and updated, for example, when a new project to implement high level requirements is initiated.

The ASLM identifier 1702 may be, for example, a unique alphanumeric code representing a descriptive name used to explicitly identify the intended functionality of a unit. One or more identification tags 1704 may explicitly maintain traceability of the ASLM identifier 1702, and the unit itself, to higher-level requirements (including derived requirements). The context 1706 may explicitly specify dependencies to entities external to the ASLM identifier 1702. The unit parameters and variables 1708 may represent formal data items expected to be received and to be outputted by the ASLM identifier 1702. The internal logic 1710 may represent specific functionalities intended to be carried out by the ASLM identifier 1702 (and may be represented by a control flow network that connects block entities for the ASLM identifier 1702.

Thus, some embodiments described herein may provide a way to explicitly model arbitrary software logic at the block level. Moreover, embodiments may explicitly transform a software model among fully expanded flat logic (every logic block spelled out), abstracted and encapsulated nested logic, and split reusable units, all automatically following appropriate steps. Some embodiments may explicitly translate and maintain traceability between different forms of a model (e.g., metaclasses, graphical representation, and software code). A foundation for a complete tool chain may be provided to extract the model from legacy code, to efficiently and effectively optimize and transform the model, and/or to generate code for testing and final release for complex, long-lived, safety critical avionics (and ground systems) software. Note that software unit internal logic amounts most of the resources allocated to software engineering (both in terms of man-hours and scheduled time). Embodiments described herein may establish a tool chain to address software unit internal logic level design to continuously maintain, evolve, enhance, transform, and re-innovate complex software projects.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Figure 18:
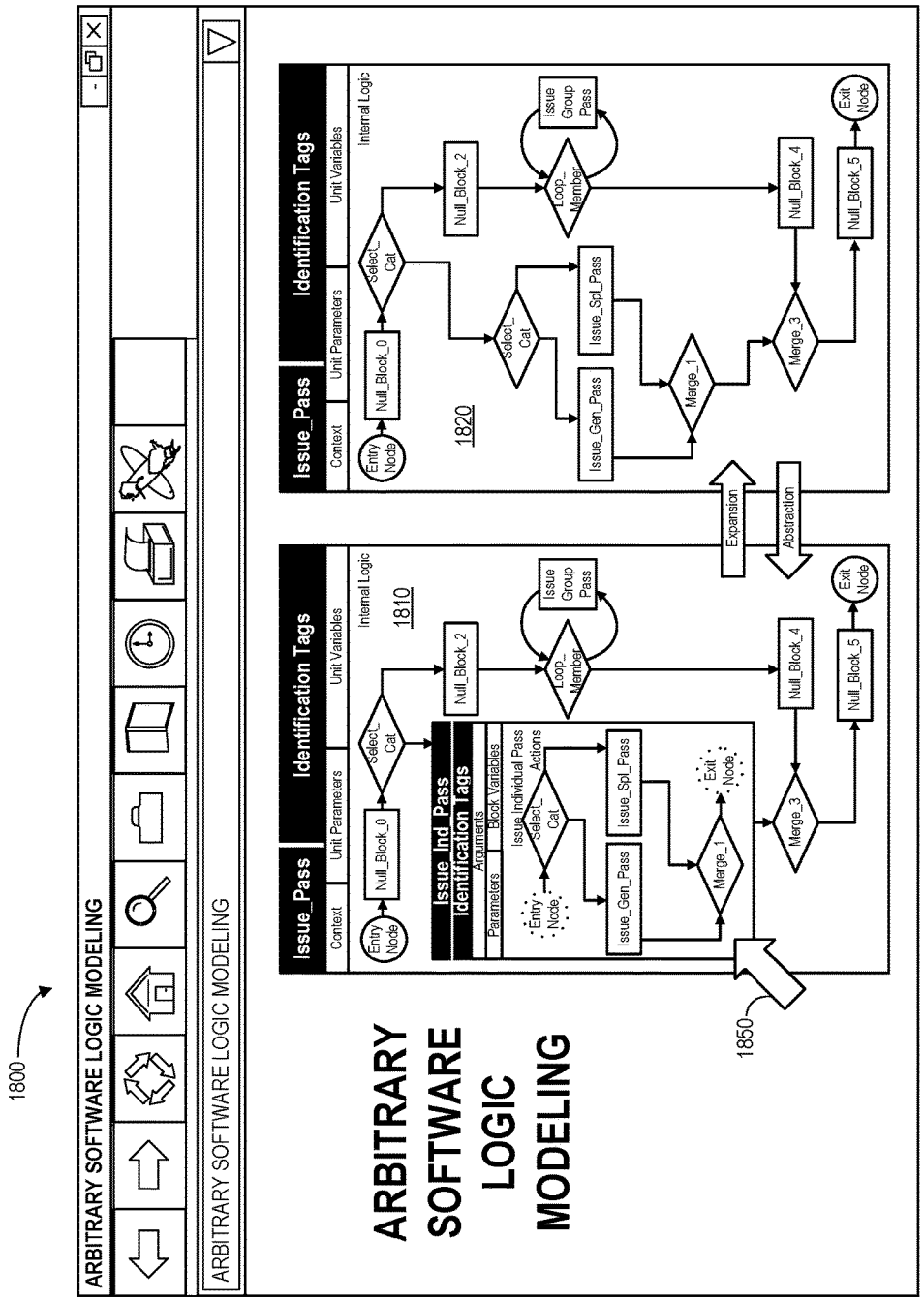
FIG. 18 is a display according to some embodiments.

Although specific hardware and data configurations have been described herein, note that any number of other configurations may be provided in accordance with embodiments of the present invention (e.g., some of the information associated with the databases described herein may be combined or stored in external systems). Moreover, note that some embodiments may be associated with a display of information to a developer. For example, FIG. 18 illustrates an interactive Graphical User Interface ("GUI") display 1800 that might display information about units 1810, 1820 that may be associated with an expansion process and/or an abstraction process. Use of a computer pointer 1850 may result in more detailed information being provided on the display 1800 (e.g., in a pop-up window), adjustments to the units 1810, 1820, etc.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

The invention claimed is:

1. A system to facilitate Arbitrary Software Logic Modeling ("ASLM") processing, comprising:
    an ASLM data source storing electronic records associated with units, each electronic record including a unit identifier, one or more identification tags, context data, unit parameters, unit variables, and internal logic; and
    an ASLM platform, coupled to the ASLM data source, including a computer programmed to:

(i) express system requirements at a logic block level;
(ii) establish the logic blocks as self-contained entities and connections in accordance with the system requirements, the established logic blocks graphically representing systems logic;
(iii) explicitly transform the systems logic automatically to output language agnostic common design information exchange model information;
(iv) translate and maintain traceability among the system requirements, common design information exchange model information, and generated code, and
(v) execute a splitting process, including:
abstracting a nested block entity for splitting into a new unit,
creating the new unit and registering a unit identifier in a data dictionary,
establishing unit parameters for the new unit,
establishing unit variables for the new unit,
transferring nested sub-logic of the nested block entity to the new unit,
generalizing block entities and control nodes encapsulated in the new unit,
establishing identification tags for the new unit and registering the new unit in a traceability map that includes a hierarchy,
updating the nested block entity with reference to the new unit, and
updating identification tags for the nested block entity and updating the nested block entity in the traceability map and repeating updates of the identification tags and traceability map for an original unit.

2. The system of claim 1, wherein system requirements comprise at least one of low-level requirements and high-level requirements and the unit parameters define an external unit interface and trace to an ontology to allow for automatic transformation of a software component interface, wherein the low-level requirements are below the high-level requirements in a hierarchy.

3. The system of claim 1, wherein at least one electronic record in the ASLM data source represents a block entity, including a block identifier, one or more identification tags, arguments, block parameters, block variables, and actions.

4. The system of claim 1, wherein the systems logic includes at least one of: control nodes, looping nodes, merge nodes, entry nodes, exit nodes, and null nodes.

5. The system of claim 1, wherein the ASLM platform is further to execute an expansion process.

6. The system of claim 5, wherein the expansion process includes:
elevating parent block variables of a parent block entity to unit variables;
re-mapping arguments for block entities and control nodes in nested sub-logic;
merging entry and exit nodes of nested sub-logic with control nodes in unit internal logic;
un-registering parent block identification tags from a traceability map that includes a hierarchy;
un-registering a parent block identifier from a data dictionary; and
releasing the parent block entity.

7. The system of claim 1, wherein the ASLM platform is further to execute an abstraction process.

8. The system of claim 7, wherein the abstraction process includes:
identifying a sub-section of logic to be abstracted;
creating a new block entity and registering a block identifier in a data dictionary;
nesting the sub-section of logic as actions of the new block entity;
connecting the new block entity to a location where the sub-section of logic originally connected;
establishing arguments for the new block entity with the nested sub-section of logic;
establishing block parameters for the nested block entity;
establishing block variables for the nested block entity; and
establishing identification tags for the nested block entity and registering the nested block entity in a traceability map that includes a hierarchy.

9. The system of claim 1, wherein the ASLM platform is further to execute a merging process.

10. The system of claim 9, wherein the merging process includes:
identifying a block entity in a combined unit that references a unit to be merged;
expanding block variables of a parent block entity to include unit variables from the unit to be merged;
transferring internal logic of the unit to be merged to nested sub-logic of the parent block entity;
re-mapping arguments for block entities and control nodes merged into the nested sub-logic;
updating identification tags of the parent block entity after transfer of internal logic of the unit to be merged and expansion of block variables and updating the registration of a parent block identifier in a traceability map that includes a hierarchy and updating the identification tags and traceability map for the combined unit;
un-registering identification tags of the unit to be merged from the traceability map;
un-registering a unit identifier of the unit to be merged from a data dictionary; and
releasing the unit to be merged.

11. A computerized method to facilitate Arbitrary Software Logic Modeling ("ASLM") processing, comprising:
accessing an ASLM data source storing electronic records associated with units, each electronic record including a unit identifier, one or more identification tags, context data, unit parameters, unit variables, and internal logic;
expressing, via a computer processor of an ASLM platform, system requirements at a logic block level;
establishing the logic blocks as self-contained entities and connections in accordance with the system requirements, the established logic blocks graphically representing systems logic;
explicitly transforming the systems logic automatically to output language agnostic common design information exchange model information;
translating and maintaining traceability among the system requirements, common design information exchange model information, and generated code, and
executing a merging process, including:
identifying a block entity in a combined unit that references a unit to be merged;
expanding block variables of a parent block entity to include unit variables from the unit to be merged;
transferring internal logic of the unit to be merged to nested sub-logic of the parent block entity;
re-mapping arguments for block entities and control nodes merged into the nested sub-logic;
updating identification tags of the parent block entity after transfer of internal logic of the unit to be merged and expansion of block variables and updating the registration of the parent block identifier in a traceability map that includes a hierarchy and updating the identification tags and traceability map for the combined unit;

un-registering identification tags of the unit to be merged from the traceability map;

un-registering a unit identifier of the unit to be merged from a data dictionary; and releasing the unit to be merged.

12. The method of claim 11, wherein system requirements comprise at least one of low-level requirements and high-level requirements, wherein the low-level requirements are below the high-level requirements in a hierarchy.

13. The method of claim 11, wherein at least one electronic record in the ASLM data source represents a block entity, including a block identifier, one or more identification tags, arguments, block parameters, block variables, and actions.

14. The method of claim 11, wherein the systems logic includes at least one of: control nodes, looping nodes, merge nodes, entry nodes, exit nodes, and null nodes.

15. The method of claim 11, wherein the ASLM platform is further to execute at least one of: an expansion process, an abstraction process, and a splitting process.

16. A non-transitory, computer-readable medium storing instructions that, when executed by a computer processor, cause the computer processor to perform a method to facilitate Arbitrary Software Logic Modeling ("ASLM") processing, the method comprising:

accessing an ASLM data source storing electronic records associated with units, each electronic record including a unit identifier, one or more identification tags, context data, unit parameters, unit variables, and internal logic;

expressing, via a computer processor of an ASLM platform, system requirements at a logic block level;

establishing the logic blocks as self-contained entities and connections in accordance with the system requirements, the established logic blocks graphically representing systems logic;

explicitly transforming the systems logic automatically to output language agnostic common design information exchange model information;

translating and maintaining traceability among the system requirements, common design information exchange model information, and generated code, and executing a splitting process, including:

abstracting a nested block entity for splitting into a new unit, creating the new unit and registering a unit identifier in a data dictionary, establishing unit parameters for the new unit, establishing unit variables for the new unit, transferring nested sub-logic of the nested block entity to the new unit, generalizing block entities and control nodes encapsulated in the new unit, establishing identification tags for the new unit and registering the new unit in a traceability map that includes a hierarchy, updating the nested block entity with reference to the new unit, and updating identification tags for the nested block entity and updating the nested block entity in the traceability map and repeating updates of the identification tags and traceability map for an original unit.

17. The medium of claim 16, wherein the system requirements comprise at least one of low-level requirements and high-level requirements, wherein the low-level requirements are below the high-level requirements in a hierarchy.

18. The medium of claim 16, wherein at least one electronic record in the ASLM data source represents a block entity, including a block identifier, one or more identification tags, arguments, block parameters, block variables, and actions.

19. The medium of claim 16, wherein the systems logic includes at least one of: control nodes, looping nodes, merge nodes, entry nodes, exit nodes, and null nodes.

20. The medium of claim 16, wherein the ASLM platform is further to execute at least one of: an expansion process, an abstraction process, and a merging process.

* * * * *